(12) United States Patent
Mujtaba et al.

(10) Patent No.: US 8,897,731 B2
(45) Date of Patent: Nov. 25, 2014

(54) METHODS AND APPARATUS FOR ADAPTIVE RECEIVER DIVERSITY IN A WIRELESS NETWORK

(71) Applicant: Apple Inc., Cupertino, CA (US)

(72) Inventors: Syed Aon Mujtaba, Santa Clara, CA (US); Xiaowen Wang, Cupertino, CA (US); Tarik Tabet, Cupertino, CA (US); Kee-Bong Song, Cupertino, CA (US); Youngjae Kim, Cupertino, CA (US); Yuchul Kim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/779,661

(22) Filed: Feb. 27, 2013

(65) Prior Publication Data

US 2013/0288624 A1    Oct. 31, 2013

Related U.S. Application Data

(60) Provisional application No. 61/606,311, filed on Mar. 2, 2012.

(51) Int. Cl.
*H04B 1/18* (2006.01)
*H04B 7/08* (2006.01)
*H04W 52/02* (2009.01)

(52) U.S. Cl.
CPC ......... *H04B 7/0871* (2013.01); *H04W 52/0209* (2013.01); *H04B 7/0817* (2013.01)
USPC ...................................... 455/132; 455/277.2

(58) Field of Classification Search
CPC ............................ H04B 7/0817; H04B 7/0877
USPC .................... 455/132–135, 140, 277.1, 277.2
See application file for complete search history.

(56) References Cited

U.S. PATENT DOCUMENTS

| 2004/0253955 | A1 | 12/2004 | Love et al. | |
| 2010/0056157 | A1* | 3/2010 | Verona et al. | 455/438 |
| 2010/0210235 | A1* | 8/2010 | Ulupinar et al. | 455/278.1 |
| 2011/0110251 | A1* | 5/2011 | Krishnamurthy et al. | 370/252 |
| 2011/0149765 | A1* | 6/2011 | Gorokhov et al. | 370/252 |

FOREIGN PATENT DOCUMENTS

EP    1 914 901    4/2008

* cited by examiner

*Primary Examiner* — Lee Nguyen
(74) *Attorney, Agent, or Firm* — Fay Kaplun & Marcin, LLP

(57) ABSTRACT

Apparatus and methods for implementing "intelligent" receive diversity management in e.g., a mobile device. In one implementation, the mobile device includes an LTE-enabled UE, and the intelligent diversity management includes selectively disabling receive diversity (RxD) in that device upon meeting a plurality of criteria including (i) a capacity criterion, and (ii) a connectivity criterion. In one variant, the capacity criterion includes ensuring that an achievable data rate associated with a single Rx (receive) chain is comparable to that with RxD.

16 Claims, 18 Drawing Sheets

METHODS AND APPARATUS FOR ADAPTIVE RECEIVER DIVERSITY IN A WIRELESS NETWORK

PRIORITY APPLICATIONS

This application claims priority to co-owned U.S. Provisional Application Ser. No. 61/606,311 of the same title filed Mar. 2, 2012, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of wireless communication, and data networks. More particularly, in one exemplary embodiment, methods and apparatus for managing receive operations in a multi-antenna wireless device or system are disclosed.

2. Description of Related Technology

Power consumption is a critical factor in modern mobile device design (and in fact with respect to other types of devices as well). In the particular context of mobile devices (such as cell phones, smartphones, tablets, handhelds, etc.), reducing power consumption can offer a variety of different benefits, including without limitation enhanced user experience (through e.g., the device being more available to the user, and requiring less frequent recharging, etc.), and increased longevity and reliability of the device and its components.

However, as modern wireless interface technologies have evolved, they have generally trended toward more power consumptive designs, so as to support e.g., very high data rates, streaming high-bandwidth video or other media, more complex/intensive applications, etc. In certain of such advanced wireless technologies, multiple antennas are used to, inter alia, receive wireless signals transmitted from another device (e.g., a mobile device, or base station). The use of multiple antennas for transmission and reception is commonly referred to as "antenna diversity", and is commonly further subdivided into "receive diversity" and "transmit diversity". Those of ordinary skill in the related arts will readily appreciate that various other types of diversity exist and are commonly used (e.g., time diversity, frequency diversity, spatial diversity, polarization diversity, etc.).

In the exemplary context of Long Term Evolution (LTE), existing LTE user equipment (UE) utilizes an antenna diversity scheme that is statically configured and invariant. More directly, the number of antennas that are available for use does not change (i.e., "static"). The LTE standard (and hence any compliant transmitting device such as a base station) assumes that the UE is configured with at least two (2) receive "chains" (as used hereinafter, the term "chain" refers to one or more chained processing elements and/or logic). While diversity implementations can provide higher data rates, diversity also consumes more power than using a single receive chain.

Unfortunately, receiver diversity may not be necessary under certain conditions, such as for example: (i) when receiving relatively low data rate signaling (e.g., a physical downlink control channel (PDCCH) or paging message(s) when radio conditions are good), (ii) when receiving a so-called "rank one (1)" transmission, etc. As a brief aside, the term "rank" formally refers to the mathematical rank (i.e., the number of linearly independent eigen-vectors) of a channel matrix that represents the communication channels (h) between each pair of transmit (columns) and receive antennas (rows). However, as used within common parlance (e.g., within the LTE standard), "rank" refers to the number of spatial layers transmitted from transmitter. For example, a rank one (1) transmission represents the usage scenario where each of the transmitters is transmitting essentially the same data or a linear transformation of the same data. In the exemplary case of LTE, an eNB that is transmitting a rank one (1) transmission is sending only one layer of information. More generally, receiver diversity is unnecessary in any scenario where the increase in data rate or the increase in reliability provided by diversity operation does not justify its "cost" (e.g., power consumption, processing complexity, etc.).

Therefore, there is a need for, inter alia, an "adaptive" mechanism to selectively or intelligently enable/disable more power consumptive operational modes (such as receiver diversity modes in an exemplary LTE networks) in order to, inter alia, reduce power consumption in the mobile device, ideally without compromising mobile device performance (and hence user experience).

SUMMARY

The present disclosure provides, inter alia, apparatus and methods for adaptive or "intelligent" receiver diversity operation within a wireless network.

A method for providing adaptive or intelligent receive diversity operation is disclosed. In one embodiment, the receive diversity is implemented in a mobile device such as e.g., an LTE-enabled cellular device, and the method includes selectively disabling receive diversity (RxD) in that device upon meeting a plurality of criteria including (i) a capacity criterion, and (ii) a connectivity criterion.

In one variant, the capacity criterion includes ensuring that an achievable data rate associated with a single receive (RX) chain is comparable to that with RxD.

In another embodiment, the receive diversity device includes an LTE-enabled mobile device, and the method includes selectively enabling receive diversity (RxD) from a non-diversity state (noRxD) state upon meeting either one of at least two criteria including (i) a connectivity criterion, or (ii) a capacity criterion. In one variant of the method, when operating in a noRxD state, RxD is enabled when either the connectivity or capacity conditions are met.

A mobile apparatus is further disclosed. In one exemplary embodiment, the mobile apparatus includes a receiver; a processor in signal communication with the receiver; and logic configured to implement adaptive or intelligent receive diversity operation.

A wireless system is also disclosed. In one embodiment, the system includes at least one base station and at least one wireless mobile device. The base station and wireless mobile device are further configured to implement an adaptive or intelligent diversity reception scheme so as to, inter alga, reduce mobile device power consumption.

A computer readable apparatus is further disclosed. In one embodiment, the apparatus includes a storage medium having a computer program disposed thereon, the program configured to, when executed, implement adaptive or intelligent receive diversity operation in a wireless device such as a mobile device or UE.

A system is also disclosed. In one embodiment, the system includes one or more base stations, and one or more intelligent receive diversity-enabled UE's.

A method for operating a wireless system is additionally disclosed.

A mobile apparatus configured to implement adaptive receive diversity is also disclosed. In one embodiment, the mobile apparatus includes: a processor; one or more wireless receivers configured to operate in at least a first and second diversity modes; and computerized logic in data communication with the processor and one or more wireless receivers. In one exemplary embodiment, the computerized logic is configured to: evaluate a capacity condition and a connectivity condition; when the capacity condition and the connectivity condition are met, operate in the first diversity mode; and when either the capacity condition or the connectivity condition are not met, operate in the second diversity mode.

In another embodiment, the connectivity condition includes a lack of cyclic redundancy check (CRC) failures over one or more consecutive paging cycles. In one basic variant, the capacity condition comprises a reference signal to interference plus noise ratio (RS SINR) exceeding a first threshold. In another variant, the capacity condition includes a difference in a first RS SINR associated with the first diversity mode and a second RS SINR associated with the second diversity mode. In another variant, the capacity condition includes a difference in a first channel quality indication (CQI) associated with the first diversity mode and a second CQI associated with the second diversity mode. In still another variant, the capacity condition includes a difference in a first spectral efficiency associated with the first diversity mode and a second spectral efficiency associated with the second diversity mode.

A method for intelligently performing adaptive receive diversity is further disclosed. In one embodiment, the method includes: determining (i) a connectivity criterion and (ii) a capacity criterion; communicating via a wireless receiver, the wireless receiver configurable in at least a first diversity scheme and a second diversity scheme; where the first diversity scheme can support more data capacity than the second diversity scheme; comparing a current signal quality measurement to a capacity condition; and comparing a current connection quality to a connectivity condition.

In another embodiment, when operating in the first diversity scheme, the method further includes: when the current signal quality measurement satisfies the capacity condition and the current connection quality satisfies the connectivity condition, transitioning to the second diversity scheme. When operating in the second diversity scheme, the method further includes: when either the current signal quality measurement does not satisfy the capacity condition or the current connection quality does not satisfy the connectivity condition, transitioning to the first diversity scheme.

In one variant, the first diversity scheme includes a multiple input multiple output (MIMO) diversity scheme. In some cases, the second diversity scheme includes a non-diversity scheme. In other cases, the second diversity scheme includes a lower order MIMO diversity scheme.

In a second variant, the signal quality measurement includes a signal to interference plus noise ratio (SINR).

In another such variant, the signal quality measurement includes a channel quality indication (CQI).

In still other variants, the signal quality measurement includes a difference between a first signal quality measurement associated with the first diversity scheme and a second signal quality measurement associated with the second diversity scheme.

In yet another variant, the current connection quality is based on a reference signal to interference plus noise ratio (RS_SINR) that is greater than a threshold or one or more cyclic redundancy checks of one or more control channels.

A method for dynamically overriding a rank instruction is also disclosed. In one embodiment, the method includes: communicating via a wireless receiver, the wireless receiver configured to select at least a first diversity scheme and a second diversity scheme based on a rank indication signal received from a wireless transmitter and an override signal. In one variant, the first diversity scheme can support more data capacity than the second diversity scheme, and the method further includes comparing a current signal quality measurement to a capacity condition; comparing a current connection quality to a connectivity condition; when the current signal quality measurement satisfies the capacity condition and the current connection quality satisfies the connectivity condition, enabling the override signal to select the second diversity scheme; and otherwise selecting a diversity scheme identified by the rank indication signal.

In one variant, the first diversity scheme includes a multiple input multiple output (MIMO) diversity scheme. In one exemplary configuration, the second diversity scheme includes a non-diversity scheme. In one variant, enabling the override signal results in reduced power consumption.

A mobile apparatus configured to dynamically override a rank instruction is also disclosed. In one embodiment, the apparatus includes: a processor; one or more wireless receivers configured to operate in at least a first diversity mode and a non-diversity mode; and computerized logic in data communication with the processor and one or more wireless receivers. In one embodiment, the mobile apparatus is configured to: evaluate a capacity condition and a connectivity condition; when the capacity condition and the connectivity condition are satisfied, operate in the non-diversity mode; and otherwise select from the at least the first diversity mode and the non-diversity mode based on a rank indication signal received from a wireless transmitter.

In one such variant, the mobile apparatus includes a 2×2 Multiple Input Multiple Output (MIMO) Long Term Evolution (LTE) user equipment (UE).

Other features and advantages of the present disclosure will immediately be recognized by persons of ordinary skill in the art with reference to the attached drawings and detailed description of exemplary embodiments as given below.

All Figures© Copyright 2012-2013 Apple Inc. All rights reserved.

DETAILED DESCRIPTION

Reference is now made to the drawings, wherein like numerals refer to like parts throughout.
Overview—

Improved solutions for, inter alia, receiver diversity management are disclosed. In one embodiment, these solutions include method and apparatus for implementing "intelligent" receive diversity management in e.g., a mobile device such as a Long Term Evolution (LTE) enabled user equipment (UE). In one implementation, the intelligent diversity management includes selectively disabling receive diversity (RxD) in the device upon meeting a plurality of criteria including (i) a capacity criterion, and (ii) a connectivity criterion. In one variant, the connectivity conditions are applicable in both the LTE "IDLE" and "CONNECTED" states to ensure that the physical downlink control channel (PDCCH) can be decoded reliably in both states. In another variant, the capacity conditions are applicable only in CONNECTED state (where the physical downlink shared channel (PDSCH) data rate is variable).
Description of Exemplary Embodiments Exemplary embodiments of the present disclosure are now described in detail. While these embodiments are primarily discussed in the context of cellular networks including without limitation, Long Term Evolution (LTE) and LTE-A (Advanced) wireless networks, it will be recognized by those of ordinary skill that the present disclosure is not so limited. In fact, the various principles described herein are useful in, and readily adapted to, any wireless network that can benefit from enhanced diversity management in a receiver or transceiver, as described herein.

Moreover, while the following discussions are provided within the context of antenna diversity schemes, those of ordinary skill in the related arts will readily appreciate that various principles of the present disclosure may be readily adapted to other diversity schemes (e.g., time diversity, frequency diversity, spatial diversity, polarization diversity, etc.).
Exemplary Network Configuration—

Figure 1:
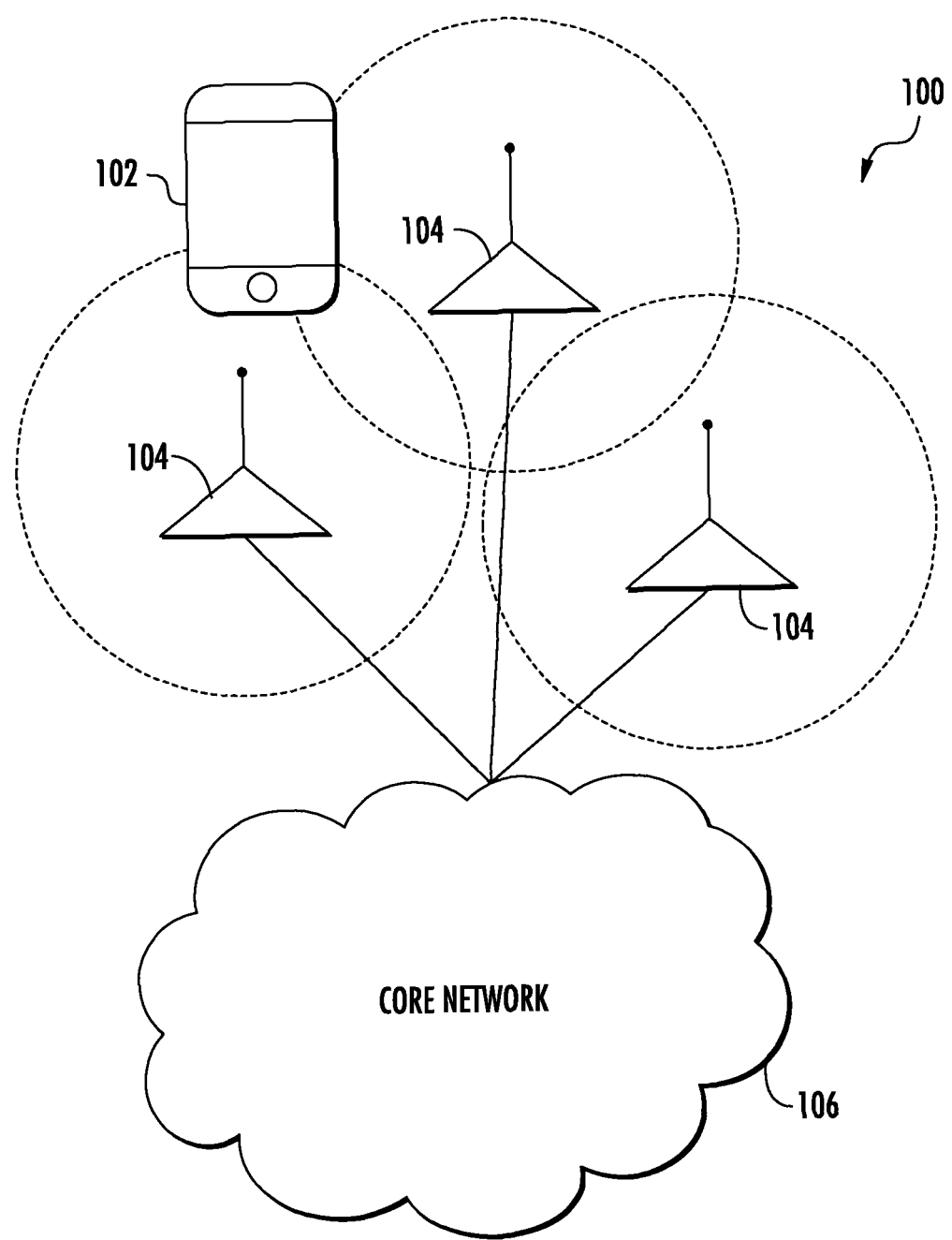
FIG. 1 is a graphical representation of one exemplary Long Term Evolution (LTE) cellular network, useful in conjunction with various embodiments described herein.

FIG. 1 illustrates one exemplary Long Term Evolution (LTE) cellular network 100, with user equipments (UEs) 102, operating within the coverage of the Radio Access Network (RAN) provided by a number of base stations (BSs) 104. The LTE base stations are commonly referred to as "Enhanced NodeBs" (eNBs). The Radio Access Network (RAN) is the collective body of eNBs. The user interfaces to the RAN via the UE, which in many typical usage cases is a cellular phone or smartphone. However, as used herein, the terms "UE", "client device", and "user device" may include, but are not limited to, cellular telephones, smartphones (such as for example an iPhone™ manufactured by the Assignee hereof), personal computers (PCs), and minicomputers, whether desktop, laptop, or otherwise, as well as mobile devices such as handheld computers or tablets such as the iPad™, PDAs, personal media devices (PMDs), or any combinations of the foregoing.

Each of the eNBs 104 is directly coupled to the Core Network 106 e.g., via broadband access. Additionally, in some networks, the eNBs may coordinate with one another via secondary access channels (such as e.g., via direct peer-to-peer networking, via the Core Network, etc.). The Core Network provides both routing and service capabilities. For example, a first UE connected to a first eNB can communicate with a second UE connected to a second eNB, via routing through the Core Network. Similarly, a UE can access other types of services e.g., the Internet, via the Core Network.
Exemplary Receiver Configuration—

Figure 2:
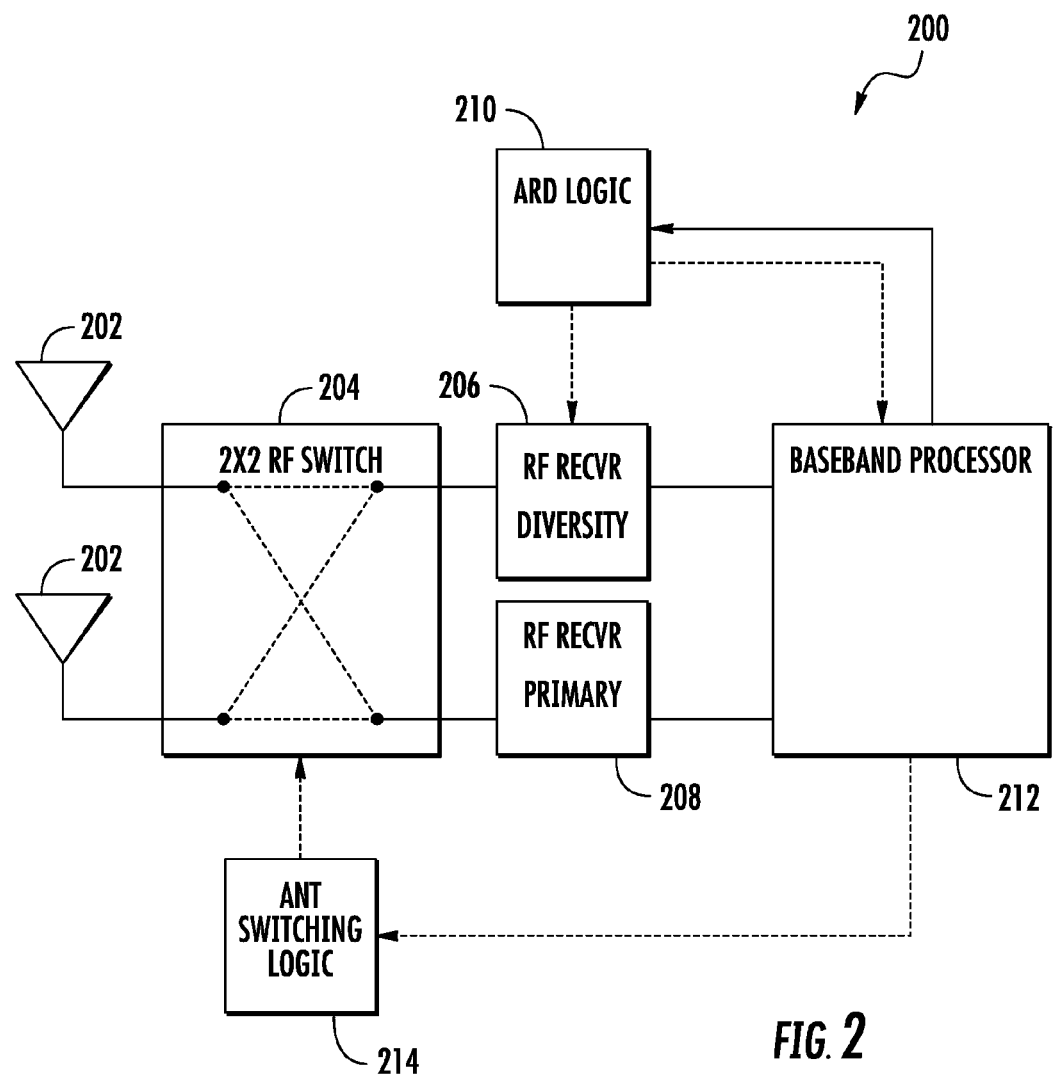
FIG. 2 is a functional block diagram illustrating an exemplary embodiment of an LTE-based receiver configuration according to the present disclosure, such as may be used in a mobile device (e.g., UE).

FIG. 2 illustrates an exemplary embodiment of LTE-based receiver configuration such as may be used in a mobile device (e.g., UE 102 of FIG. 1), with which the methods of the present disclosure may be implemented. As shown, the receiver apparatus 200 includes two antennas 202, an RF switch 204, an RF receiver (or transceiver) 206 for the "diversity" path, an RF transceiver 208 for the primary path, adaptive receive diversity (ARD) logic 210, a baseband processor 212, and antenna switching logic 214.

During operation, the antenna(s) receive RF band signals and are coupled to the diversity receiver/transceiver 206 and/or primary transceiver 208 (as determined by the switch 204). In one exemplary embodiment, by changing the state of the 2×2 RF switch 204, the antenna switching logic ensures that the better antenna (as determined by e.g., noise, interference, etc.) of the two antennas is selected as the primary path when RxD is enabled. The ARD logic 210 only needs to enable/disable the diversity path.

It will be appreciated that while FIG. 2 exhibits an exemplary two-antenna/2×2 switch configuration, the principles described herein are in no way so limited, and in fact may be practiced with other numbers of antennas, diversity receive chains, etc. Moreover, while the ARD 210, baseband processor 212, and switch control logic 214 are shown as discrete components, these may be integrated in any number of different ways, whether with each other, or with yet other components within the radio device. For instance, in one variant, the three aforementioned components are combined into a common integrated circuit (IC). As yet another variant, the radio portions of the modem (e.g., transceivers) are included in a SoC or "system on chip" device. Still other schemes and variations on the foregoing will be recognized by artisans of ordinary skill, given the contents of the present disclosure.

Moreover, it will be appreciated that at least portions of the foregoing logic can be implemented in another device, including a network device with which the UE is in communication. For example, the present disclosure contemplates that the decision logic or "intelligence" may actually be disposed in a network device such as a base station or eNodeB, which can then signal or message the relevant UE(s) to switch modes relating to RxD as described subsequently herein. Such a scheme also contemplates that any information necessary for the remote "intelligent" entity to perform such analysis can be provided from the UE if/as needed, such as via an upstream RF channel, periodic status message, or other mechanism.

Methods—

Figure 3:
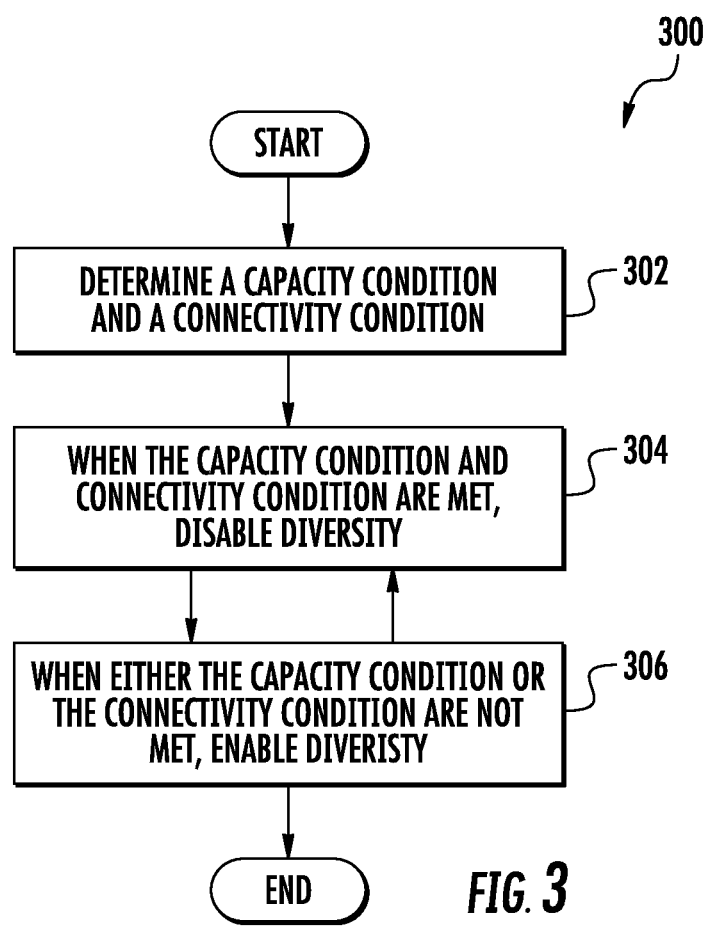
FIG. 3 is a logical block diagram of one embodiment of a generalized method for adaptive or "intelligent" receiver diversity operation within a wireless network.

Referring now to FIG. 3, one embodiment of a generalized method 300 for adaptive or "intelligent" receiver diversity operation within a wireless network is disclosed. Within the context of the method 300, a mobile device is configured to intelligently select (or request permission to enable) a diversity mode for operation, from a set of diversity modes. For example, in a 2×2 multiple-input-multiple-output (MIMO) device, the device may only have the ability to select between diversity operation (RxD) and non-diversity operation (noRxD). In more complex receivers (e.g., 3×3 MIMO, 4×4 MIMO, etc.), the receiver may have additional levels of granularity in enabling/disabling diversity modes (e.g., enabling only a subset of antennas, etc.). Various embodiments of the present disclosure may be further configured to operate with a default mode; for example, one exemplary receiver device is configured to enable diversity operation under default conditions. Default operation may be triggered where support for the following conditions cannot be determined and/or implemented (e.g., with legacy networks, etc.).

At step 302, a capacity condition and a connectivity condition are determined. In some embodiments, additional conditions are also considered. Common examples of other conditions include for example: power consumption conditions (e.g., high power consumption, low power consumption, etc.), processor activity conditions (e.g., high activity, low activity), neighboring technologies conditions (e.g., coexisting modem activity, etc.), platform noise conditions, software application conditions, etc.

As used herein, the term "capacity" relates generally and without limitation to an amount of data traffic that is required for desired receiver device functionality. Various embodiments of the present disclosure are configured to minimize capacity degradation by ensuring that the desired data rates can be met with reduced diversity mode operation.

Common examples of capacity metrics include, without limitation: a difference in reference signal (RS) signal to noise plus interference ratio (SINR) between primary and secondary antennas (e.g., $\Delta RS\_SINR = RS\_SINR_{RXD} - RS\_SINR_{NORXD}$), a difference in channel quality indication (CQI) between diversity and non-diversity operation (e.g., $\Delta CQI = CQI_{RXD} - CQI_{NORXD}$), a Rank Indication (RI), a difference in supported throughput/spectral efficiency between diversity and non-diversity operation (e.g., $\Delta R = R_{RXD}/R_{NORXD} - 1$), etc.

Consider the following exemplary capacity condition: when the RI is one (1) and $\Delta RS\_SINR$ is below a threshold value ($TH_{\Delta RS\_SINR}$), the condition is satisfied. More directly, when the transmitter is transmitting with a rank which is less than the maximum rank of the channel matrix (this is called rank deficient condition), and the performance gain of diversity operation does not significantly improve non-diversity operation, then the capacity condition is satisfied. Other variants may incorporate and/or substitute other criteria such as: where $\Delta CQI$ is less than a threshold value ($TH_{\Delta CQI}$), where $\Delta R$ is less than a threshold value ($TH_{\Delta R}$), etc.

It is appreciated that for a simple 2×2 MIMO system, the only rank deficient condition is where the rank is one (1). However, larger order MIMO systems can still support rank deficient MIMO operation. For example, a 3×3 MIMO system may consider a rank of one (1) and two (2) to be deficient; similarly, a 4×4 MIMO system can consider both rank of one (1), two (2) or three (3) to be deficient.

As used herein, the term "connectivity" relates generally to the amount of control data necessary to maintain a connection. Various embodiments of the present disclosure are configured to ensure that connectivity will not falter with lower diversity operation. It is appreciated that under certain circumstances, connectivity may be problematic (even where capacity considerations are not).

Common examples of connectivity metrics include, without limitation: reference signal (RS) signal to noise plus interference ratio (SINR) of non-diversity operation ($RS\_SINR_{NORXD}$), the channel quality indication (CQI) of non-diversity operation ($CQI_{NORXD}$), a cyclic redundancy check (CRC) history (rate of failure, etc.) on the physical downlink shared channel (PDSCH), etc.

Consider the following exemplary connectivity condition: when the $RS\_SINR_{NORXD}$ is above a threshold value ($TH_{\Delta RS}$), then the condition is satisfied. Specifically, the threshold is selected such to require a minimum reception which ensures that control channels can be decoded (e.g., the physical downlink control channel (PDCCH), paging PDSCH, and system information block (SIB) PDSCH) at a lower diversity mode without regression. Other variants may incorporate and/or substitute other criteria such as: where CQI is greater than a threshold value ($TH_{CQI}$), or where CRC failures on the PDSCH have not occurred for a minimum number of frames, etc.

Within the context of the generalized method 300, capacity conditions are applicable for ongoing data transfers (e.g., during the CONNECTED radio resource connection (RRC) state), in contrast connectivity conditions must be preserved both during data transfers, as well as when the device is idle (e.g., during both the CONNECTED RRC state, and the IDLE RRC state). Artisans of ordinary skill in the related arts will appreciate that in the IDLE RRC state, paging messages are sent within a relatively limited set of data rates; therefore, connectivity conditions that satisfy these minimum requirements can be evaluated to determine when paging reception is acceptable.

Certain embodiments may be required to account for dynamic rank transmission when evaluating capacity conditions. As a brief aside, rank one (1) transmissions only schedule a single layer to one UE at a given resource element and can be received with a single receiver chain. In contrast rank two (2) transmissions enable two layers to be scheduled to a UE at a given resource element but require at least two diversity receiver chains. Rank one (1) and rank two (2) transmissions can be dynamically scheduled by the LTE eNB, and are based on the rank indication (RI) provided by the UE. Consequently, various implementations may implement a "no rank override" or a "dynamic rank override" scheme. "No rank override" variants only evaluate capacity conditions in rank deficient conditions; for example, in a 2×2 MIMO system, the capacity condition is only evaluated when the RI equals one (1). "Dynamic rank override" variants may override the rank indicator to be sent to eNB, and disable diversity operation. For example, a receiver in 2×2 MIMO system may override a rank indicator of a rank two (2) transmission with a rank one (1) transmission, and operate with only a single receiver chain. Unlike prior art receivers which always try to find maximum possible transmission rank to, maximize capacity, the exemplary receiver can select lower rank operation with some capacity degradation to improve power consumption.

As previously alluded to, connectivity conditions are applicable to both CONNECTED RRC states and IDLE RRC states. Specifically, connectivity conditions must ensure that the control channel (e.g., the PDCCH) can be reliably decoded. Generally, connectivity conditions are based on signal reception, signal quality, and/or historic performance. Common examples of connectivity conditions for disabling diversity may include, without limitation: $RS\_SINR_{NORXD}$ remaining greater than a minimum threshold ($TH_{RS\_SINR}$), reference signal received power ($RSRP_{NORXD}$) remaining greater than a minimum threshold ($TH_{RSRP}$), reference signal received quality ($RSRQ_{NORXD}$) remaining greater than a minimum threshold ($TH_{RSRQ}$), acceptable CRC performance, UE inactivity (the UE does not expect to send/receive messages such as e.g., random access attempts/responses, scheduling requests, signaling messages, etc.).

At step 304, when the capacity condition and the connectivity condition are met, diversity operation is disabled (or reduced in order). In some embodiments, the receiver controls its own diversity operation without coordination with the transmitter. In alternate embodiments, the receiver requests and/or negotiates the appropriate diversity operation with the transmitter. In still other cases, the receiver may disable its diversity operation without informing the transmitter and accept the corresponding loss in performance.

At step 306, when either the capacity condition or the connectivity conditions are not met, diversity operation is enabled (or increased in order). It should be further noted that while disabling diversity is based on both connectivity and capacity conditions being satisfied, enabling diversity can be triggered when only one condition is met. This ensures that the minimum performance necessary to maintain connectivity and capacity requirements are always satisfied (thereby minimizing the likelihood of perceptible performance artifacts).

In some circumstances, the conditions for enabling diversity operation may complement the conditions for disabling diversity operation. In other implementations, the current reduced diversity scheme may not be able to measure conditions to determine if diversity should be increased. Thus, in some embodiments, the conditions for enabling diversity operation may be adjusted to the reduced diversity scheme.

For example, to determine when the capacity condition is met, the device may monitor e.g., timers, CQI, and/or the rank of the PDSCH, etc. In one such exemplary scenario, the receiver may enable diversity upon the expiration of a timer (T1). In other embodiments, when the $CQI_{NORXD}$ has fallen below a minimum threshold ($TH_{CQI}$), then the receiver enables diversity. In still other cases, when a data is transmitted with a higher rank (e.g., when PDSCH is transmitted with rank two (2), etc.), then the receiver may be required to enable diversity operation.

Similarly, to determine when the connectivity condition is met, the device may monitor e.g., $RS\_SINR_{NORXD}$, CQI, and/or the CRC history of the PDSCH, etc. In one such exemplary scenario, the receiver may enable diversity when the $RS\_SINR_{NORXD}$ has fallen below an acceptable threshold ($TH_{RS}$). In other embodiments, when the $CQI_{NORXD}$ has fallen below a minimum threshold ($TH_{CQI}$), then the receiver enables diversity. In still other cases, when a control channel begins to experience unacceptable error rates (e.g., when CRC failures occur on the PDSCH, etc.), then the receiver may be required to enable diversity operation. In still other variants, connectivity conditions may include e.g., reference signal received power (RSRP), reference signal received quality (RSRQ), paging message decoding history, and/or when the UE expects to send/receive messaging.

While the foregoing discussion has provided a generalized method for adaptive or "intelligent" receiver diversity operation within a wireless network, exemplary scenarios are now discussed to further illustrate the myriad of implementations, made possible with the contents of the present disclosure.

EXEMPLARY IMPLEMENTATIONS

Referring now to TABLE 1, a brief overview of several adaptive receiver diversity (ARD) implementations is illustrated; each ARD implementation uses different capacity conditions. The implementations are ordered in degree of complexity. In the following TABLE 1, $RI_{SRD}$ (rank indication for static receiver diversity) represents the rank indication which is messaged to the device (but which may be overridden).

TABLE 1

| Algorithm Type | Capacity Condition to Disable Receive Diversity | Notes |
|---|---|---|
| No Rank Override | N/A | Implementation Example #1 |
| (ARD is applicable only when RI = 1 and RI is not overridden) | $RI_{SRD} == 1$ AND $\Delta RS\_SINR < TH1$ | Implementation Example #2 |
| | $RI_{SRD} == 1$ AND $\Delta CQI < TH2$ | Implementation Example #3 |
| | $RI_{SRD} == 1$ AND $\Delta R < TH3$ | Implementation Example #4 |
| Dynamic Rank Override | ($RI_{SRD} == 1$ AND $\Delta CQI < TH2$) OR ($RI_{SRD} == 2$ AND $\Delta R_0 < TH4$ AND $\Delta CQI < TH2$) | Implementation Example #5 |
| (ARD may | ($RI_{SRD} == 1$ AND $\Delta R_1 < TH3$) OR | Implementation |

TABLE 1-continued

| Algorithm Type | Capacity Condition to Disable Receive Diversity | Notes |
|---|---|---|
| override the RI to save power) | ($RI_{SRD}$ == 2 AND $\Delta R_2$ < TH5) | Example #6 |

Implementation Example #1

Figure 4A:
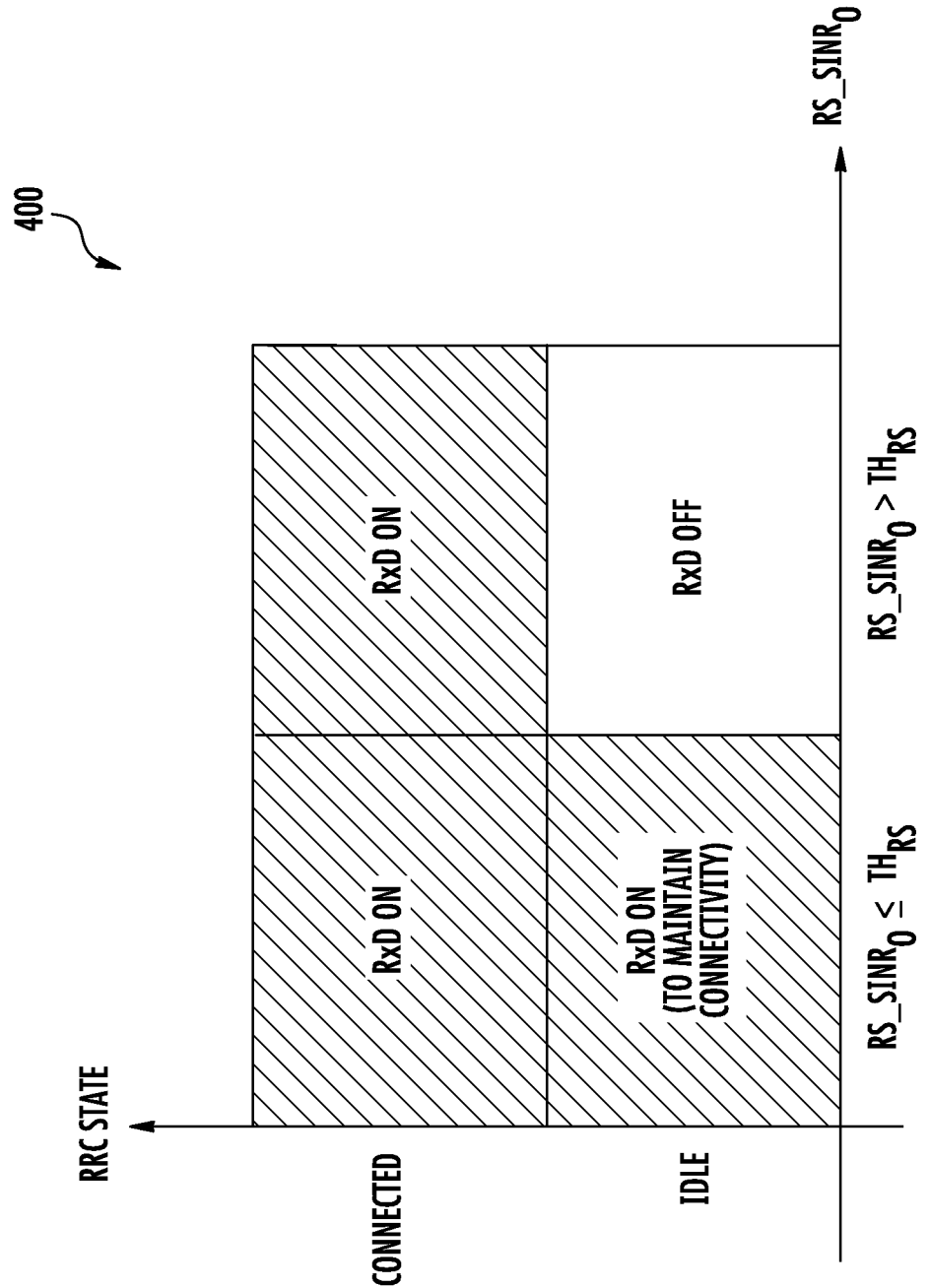
FIG. 4A is a graphical representation of one exemplary embodiment of a scheme for IDLE mode adaptive receiver diversity (ARD) with connectivity conditions, in accordance with the present disclosure.

Referring now to FIG. 4A, one exemplary method 400 for adaptive or "intelligent" receiver diversity operation within a wireless network, in accordance with Implementation Example #1 of TABLE 1 is depicted. As shown, receiver diversity is always enabled during CONNECTED RRC state. In IDLE RRC state, the key connectivity condition is met when $RS\_SINR_{NORXD}$ is greater than a minimum threshold ($TH_{RS}$).

Figure 4B:
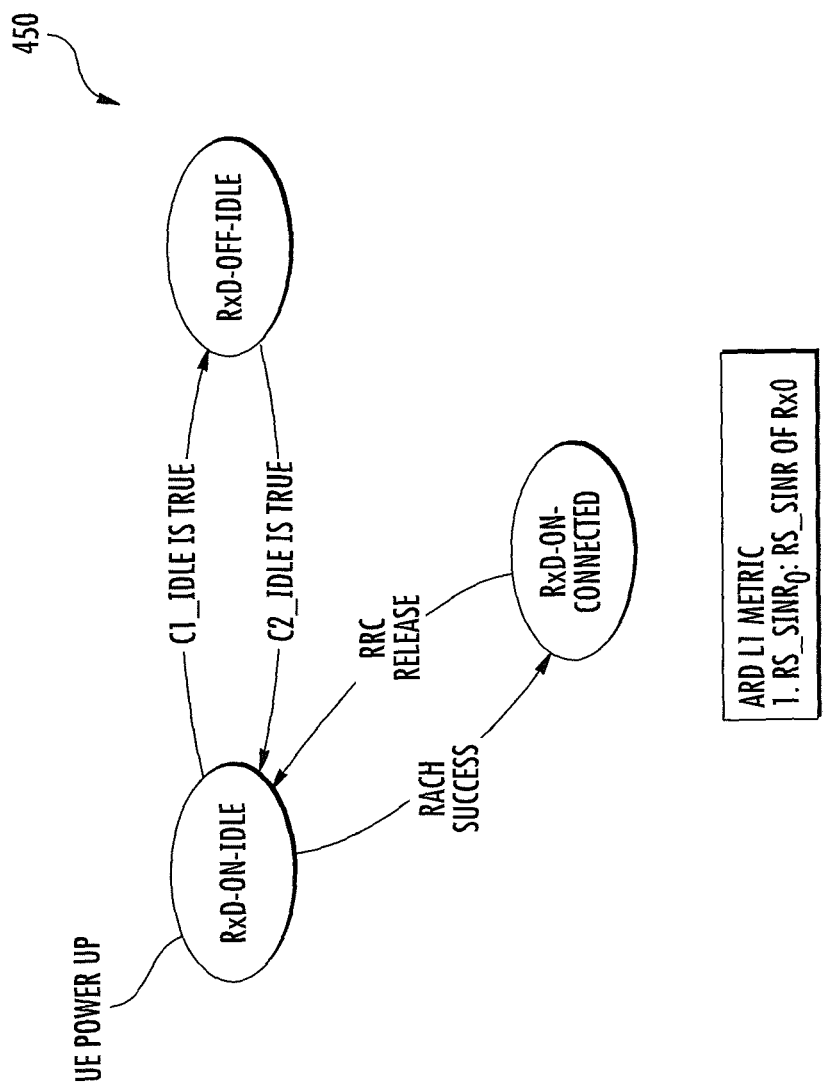
FIG. 4B is a graphical representation of one exemplary embodiment of a finite state machine (FSM) for the exemplary scheme of FIG. 4A, in accordance with the present disclosure.

FIG. 4B is a logical representation of a finite state machine (FSM) 450 representation of the scheme of FIG. 4A. As shown, the FSM has an IDLE RRC state with receiver diversity enabled (RxD-ON-IDLE), and a CONNECTED RRC state with receiver diversity enabled (RxD-ON-CONNECTED). The UE will transition between the IDLE RRC state and the CONNECTED RRC state according to typical RRC implementations (based on e.g., existing RACH access protocols and RRC connection/release protocols).

Additionally, as illustrated within FIG. 4B, an additional RRC IDLE state without receiver diversity (RXD-OFF-IDLE) can be transitioned to from the RXD-ON-IDLE state. The transition criteria for disabling receiver diversity (C1_IDLE) are when the connectivity conditions are met, i.e., $RS\_SINR_{NORXD}$ is greater than a minimum threshold ($TH_0$) and no CRC failures on the PDSCH for a number of consecutive paging cycles (N1_IDLE) and UE inactivity. The minimum threshold is selected to ensure that PDCCH and PDSCH decoding performance are met. Also, it should be appreciated that the N1_IDLE counter is reset when CRC failure occurs (e.g., when the receiver's paging radio network temporary identity (P-RNTI) cannot be successfully decoded in the appropriate PDSCH paging channel).

Similarly, the transition criteria for enabling receiver diversity (C2_IDLE) is where the connectivity condition is not met ($RS\_SINR_{NORXD}$ is less than a minimum threshold ($TH_1$) or one or more CRC failures on the PDSCH for a number of consecutive paging cycles (N1_IDLE) or impending UE activity). It should be noted that simplified embodiments may set $TH_0$ and $TH_1$ to the same value (i.e., the same threshold is used), or alternately $TH_0$ and $TH_1$ may have a difference so as to minimize unnecessary switching (also referred to as "hysteresis"). Larger differences between $TH_0$ and $TH_1$ will increase hysteresis, but can reduce performance as larger swings in $RS\_SINR_{NORXD}$ are necessary to re-enable diversity.

As previously noted, RS_SINR is the signal to interference and noise ratio (SINR) as measured from reference signals (RS). For orthogonal frequency division multiplex (OFDM) technologies, the RS_SINR can be computed according to EQN 1.

$$RS\_SINR_{r,t} = 10 \log_{10}[\Sigma_{nt}(S_{r,nt})/\Sigma_{nt}(I_{r,nt})] \qquad \text{EQN. 1}$$

Where:
r=receiver chain index (for a two (2) antenna receiver, r=0, 1);
t=transmitter port index (for a four (4) antenna transmitter, t=0, 1, 2, 3);
$n_t$=subcarrier index for RS symbol of the transmitter port index t;
$S_{r,nt}$=RS signal power at the r-th receiver chain at the n-th subcarrier; and
$I_{r,nt}$=Noise and interference power at the r-th receiver chain at the n-th subcarrier.

In some variants, when more than one transmitter port is used, the RS_SINR can be combined across the transmitter ports in order to reflect transmit diversity combining gains at the receiver, as shown in EQN. 2.

$$RS\_SINR_{NORXD} = 10 \log_{10}(10^{0.1 \times RS\_SINR0,0} + 10^{0.1 \times RS\_SINR0,1}) \qquad \text{EQN. 2}$$

Moreover, it should be appreciated that while specific examples are provided for estimating RS_SINR, those of ordinary skill in the related arts may readily adapt and/or substitute the foregoing calculations for other technologies and/or applications, given the contents of the present disclosure.

Implementation Example #2

Figure 5A:
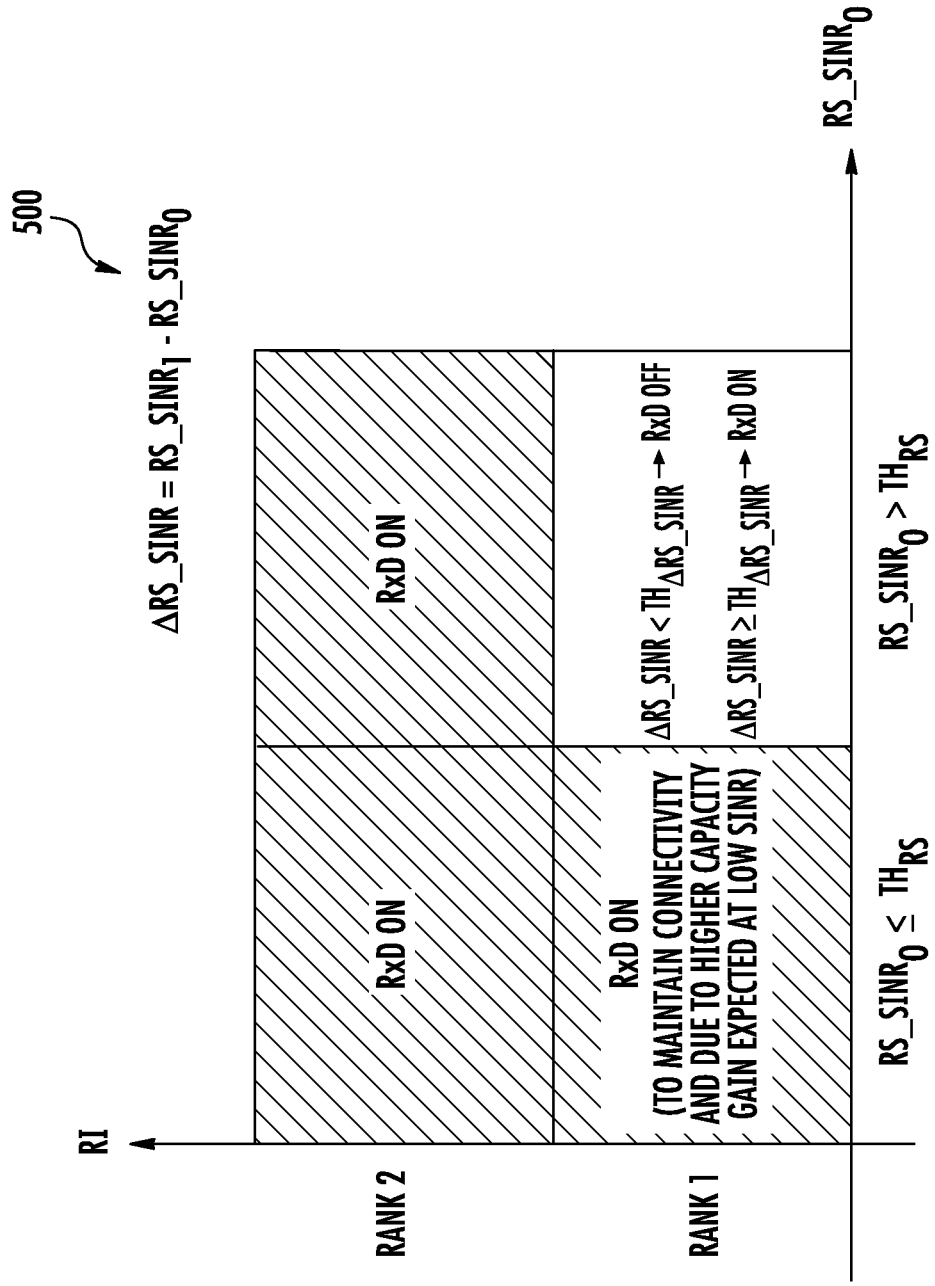
FIG. 5A is a graphical representation of one exemplary embodiment of a scheme for ARD using reference signal to interference plus noise ratio measurements ($\Delta RS\_SINR$) as a capacity condition, without rank override capability, in accordance with the present disclosure.

Referring now to FIG. 5A, one exemplary embodiment of a method 500 for adaptive or "intelligent" receiver diversity operation within a wireless network, in accordance with Implementation Example #2 of TABLE 1 is depicted. In Example #2, receiver diversity is always enabled during transmissions of rank two (2) state, but can be disabled during transmissions of rank one (1). For transmissions of rank one (1), the key capacity condition is met when $RS\_SINR_{NORXD}$ is greater than a minimum threshold ($TH_{RS}$), and the $\Delta RS\_SINR$ is greater than a minimum threshold ($TH_{ARS\_SINR}$).

Figure 5B:
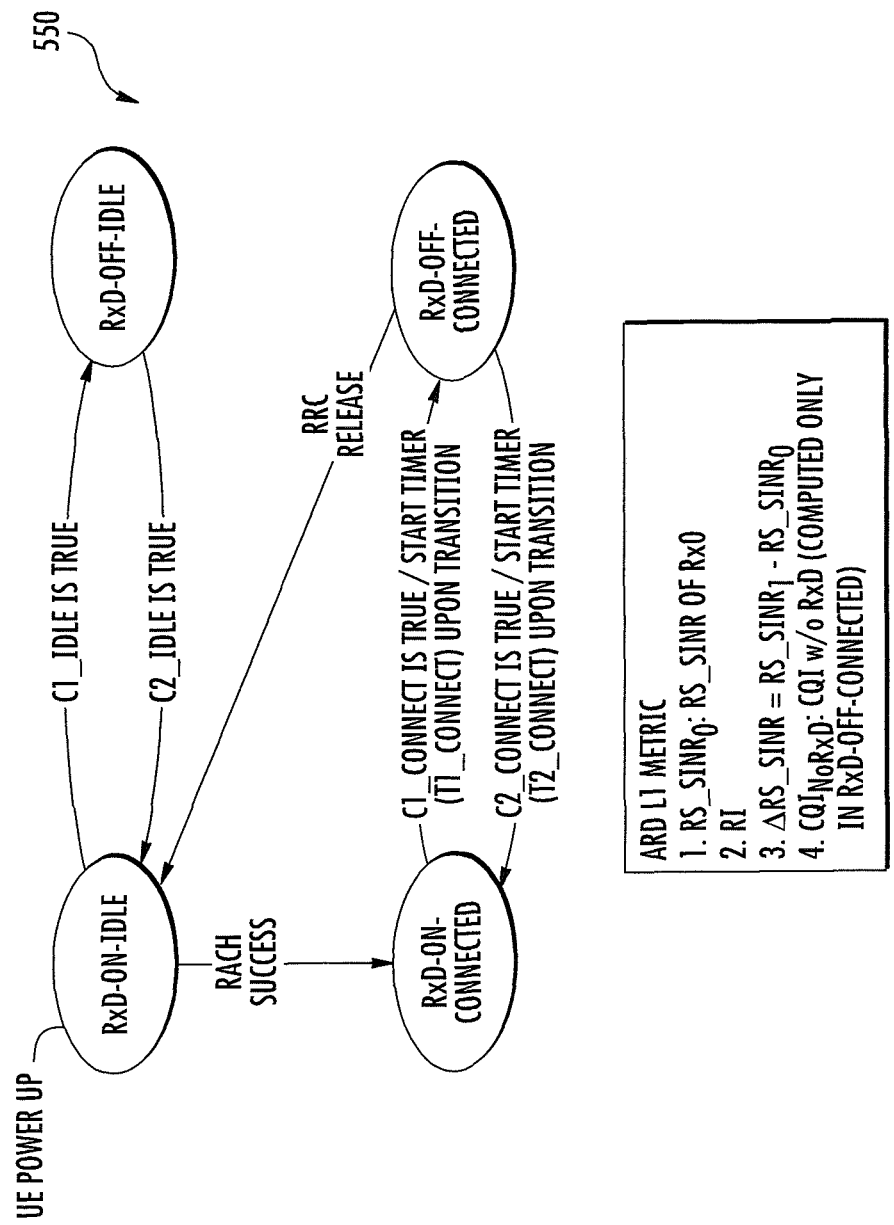
FIG. 5B is a graphical representation of one exemplary embodiment of a finite state machine (FSM) for the exemplary scheme of FIG. 5A, in accordance with the present disclosure.

FIG. 5B is a logical representation of an embodiment of a finite state machine (FSM) 550 representation of the scheme of FIG. 5A. As shown, the FSM has an IDLE RRC state with receiver diversity enabled (RxD-ON-IDLE), a CONNECTED RRC state with receiver diversity enabled (RxD-ON-CONNECTED), an IDLE RRC state with receiver diversity disabled (RxD-OFF-IDLE), and a CONNECTED RRC state with receiver diversity disabled (RxD-OFF-CONNECTED).

As shown, the transition conditions for RxD-OFF-IDLE are the same as those used within Implementation Example #1.

As illustrated within FIG. 5B, the RxD-OFF-CONNECTED state supports a secondary set of conditions C1_CONNECT and C2_CONNECT and associated timers T1_CONNECT and T2_CONNECT. The transition criteria for disabling receiver diversity while connected (C1_CONNECT) are when: (i) connectivity condition are met ($RS\_SINR_{NORXD}$ is greater than a minimum threshold ($TH_2$)) and (ii) capacity conditions are met (e. g., $\Delta RS\_SINR$ is less than a minimum threshold ($TH_4$) and the UE has been reporting a consistent RI of rank one (1) for a number of consecutive subframes (N_Rank1), (iii) there are no PDSCH with rank two (2) scheduled for a number of consecutive subframes (N_NoRank2), (iv) the receiver has been reliably operating in diversity mode for a minimum time (T2_CONNECT) and the UE is not sending SR or RACH. The T2_CONNECT timer ensures that the metrics for adaptive receive diversity are reliably estimated.

Similarly, the transition criteria for enabling receiver diversity (C2_CONNECT) is where: (i) the connectivity condition is not met ($RS\_SINR_0$ is less than a minimum threshold ($TH_3$)) or the capacity conditions are not met ($CQI_{NORXD}$ is less than a minimum threshold ($TH_5$), or a rank two (2) PDSCH transmission is scheduled, or the UE expects activity, or a maximum timer has expired (T1_CONNECT)). In this example, $CQI_{NORXD}$ is the CQI without receive diversity, and is computed only during the RxD-OFF-CONNECTED state.

Implementation Example #3

Figure 6A:
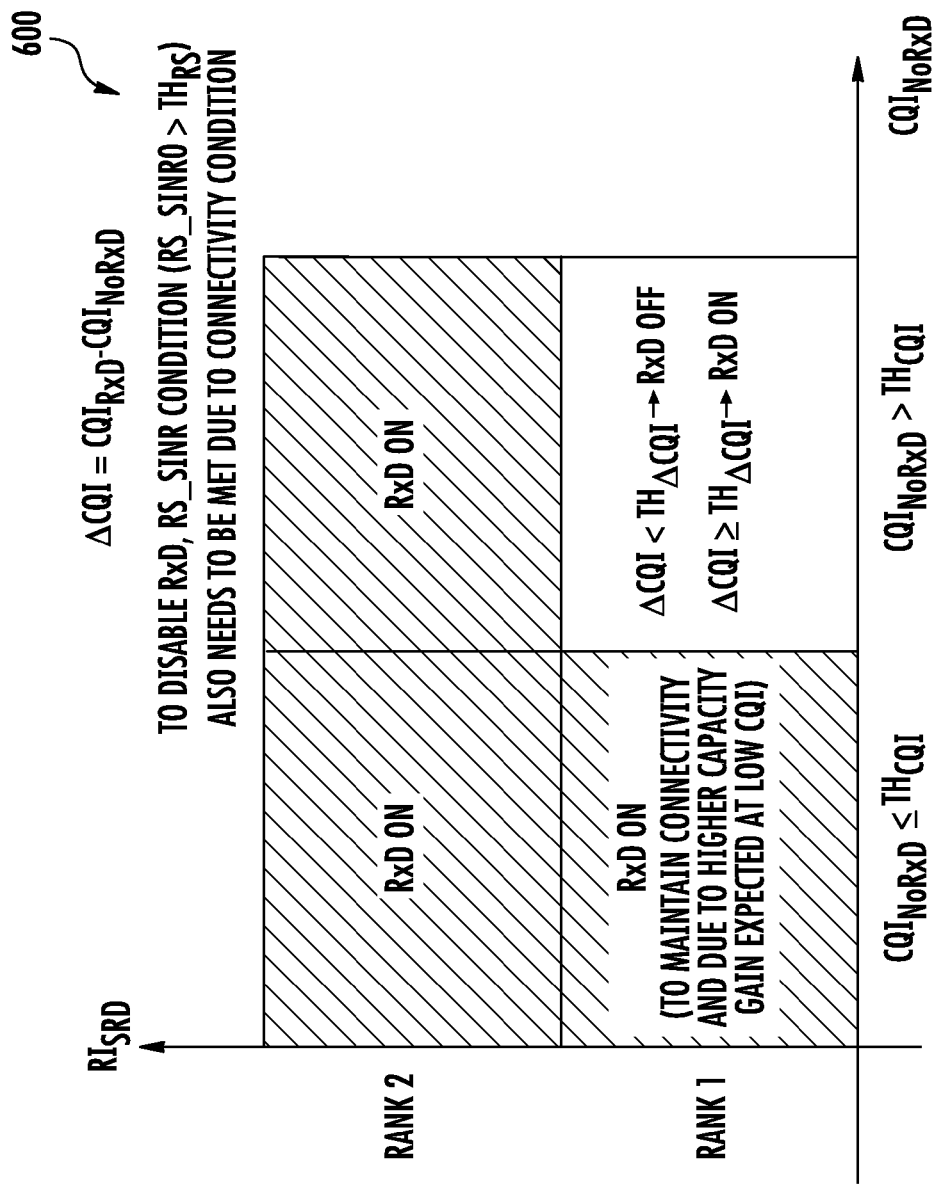
FIG. 6A is a graphical representation of one exemplary embodiment of a scheme for ARD using channel quality indication ($\Delta CQI$) as a capacity condition, without rank override capability, in accordance with the present disclosure.

Referring now to FIG. 6A, one exemplary embodiment of a method 600 for adaptive or "intelligent" receiver diversity operation within a wireless network, in accordance with Implementation Example #3 of TABLE 1 is depicted. In Example #3 (as in Example #2), receiver diversity is always enabled during transmissions of rank two (2) state, but can be disabled during transmissions of rank one (1). For transmissions of rank one (1), the key capacity condition is met when $CQI_{NORXD}$ is greater than a minimum threshold ($TH_{CQI}$), and the ΔCQI is greater than a minimum threshold ($TH_{\Delta CQI}$).

Figure 6B:
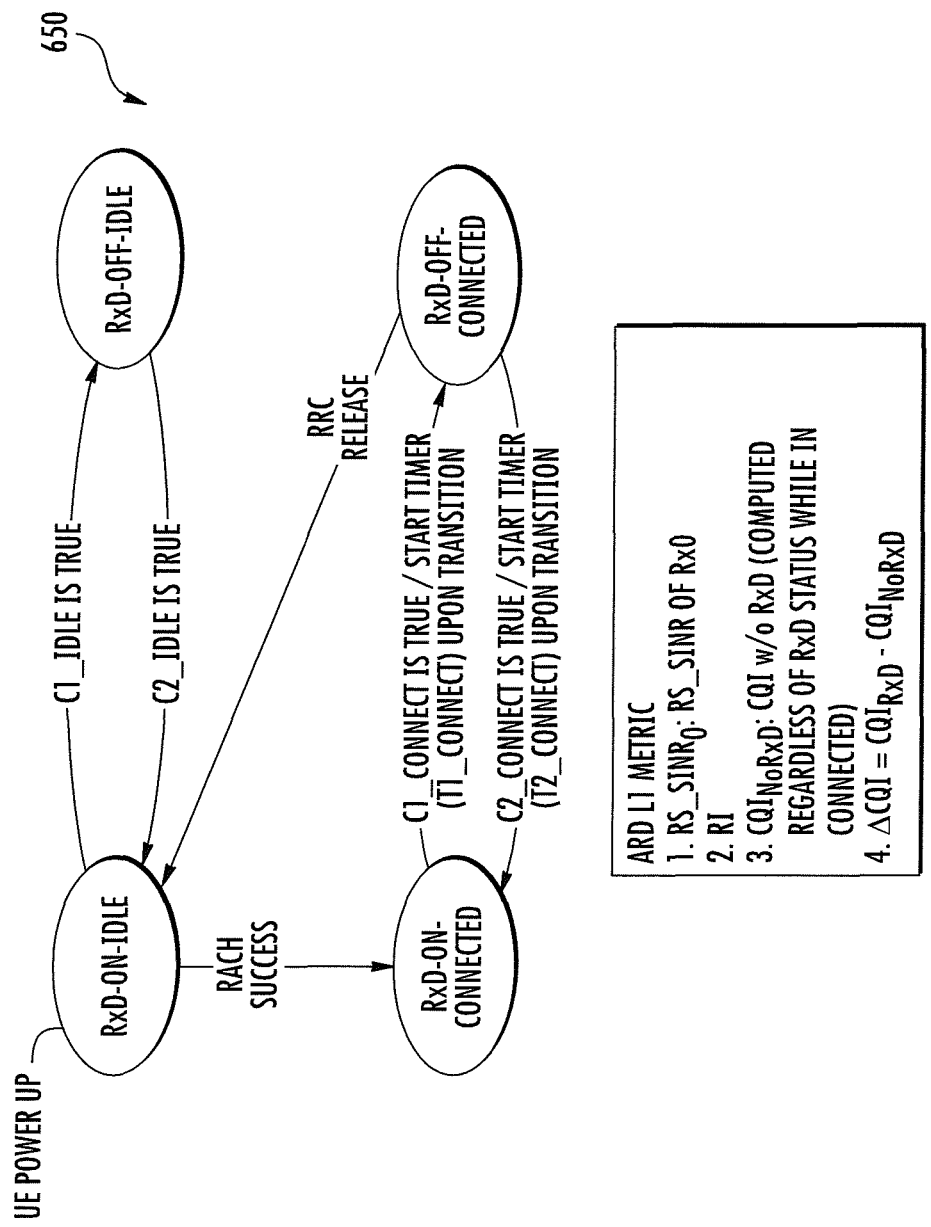
FIG. 6B is a graphical representation of one exemplary embodiment of a finite state machine (FSM) for the exemplary scheme of FIG. 6A, in accordance with the present disclosure.

FIG. 6B is a logical representation of a finite state machine (FSM) 650 representation of the scheme of FIG. 6A. As shown, the FSM has an IDLE RRC state with receiver diversity enabled (RxD-ON-IDLE), a CONNECTED RRC state with receiver diversity enabled (RxD-ON-CONNECTED), an IDLE RRC state with receiver diversity disabled (RxD-OFF-IDLE), and a CONNECTED RRC state with receiver diversity disabled (RxD-OFF-CONNECTED).

The transition conditions for RxD-OFF-IDLE are the same as the implementation of Example #2, and the transition to RxD-OFF-CONNECTED is very similar to those used within Implementation Example #2. However, rather than using ΔRS_SINR, Implementation Example #3 uses a capacity condition based on CQI based measurements ($CQI_{NORXD}$, and ΔCQI). Specifically, the capacity conditions for Example #3 are where (e. g., $CQI_{NORXD}$ is greater than a maximum threshold ($TH_6$) and the UE has been reporting a consistent RI of rank one (1) for a number of consecutive subframes (N_Rank1) and ΔCQI exceeds a maximum threshold ($TH_7$), The other conditions may remain the same e.g., the connectivity condition, there are no PDSCH with rank two (2) scheduled for a number of consecutive subframes (N_NoRank2), and the receiver has been reliably operating in diversity mode for a minimum time (T2_CONNECT) and the UE is not sending SR or RACH. Those of ordinary skill in the related arts may readily substitute other conditions, the foregoing being purely illustrative.

As a brief aside, the UE periodically sends feedback about the downlink channel state to the eNB. The feedback metrics include the: rank indicator (RI) which indicates how many layers (i.e., independent spatial streams/layers) the UE can simultaneously decode, CQI that indicates the effective signal to noise ratio for each layer (which directly corresponds to the codeword size the UE can reliably receive for each layer), and the precoding matrix index (PMI) which indicates which precoding matrix the UE prefers for closed loop transmission.

During rank one (1) transmissions (or when the UE is reporting rank one (1)), the ΔCQI represents the performance difference between diversity ($CQI_{RXD}$) and non-diversity operation ($CQI_{NORXD}$). While CQI is a more complex computation than e.g., RS_SINR, $CQI_{RXD}$ and $CQI_{NORXD}$ can both be calculated regardless of diversity status while in CONNECTED operation (e.g., RxD-OFF-CONNECTED and RxD-OFF-CONNECTED) which provides a very accurate representation of how switching to non-diversity operation would impact ongoing communications.

Implementation Example #4

Figure 7A:
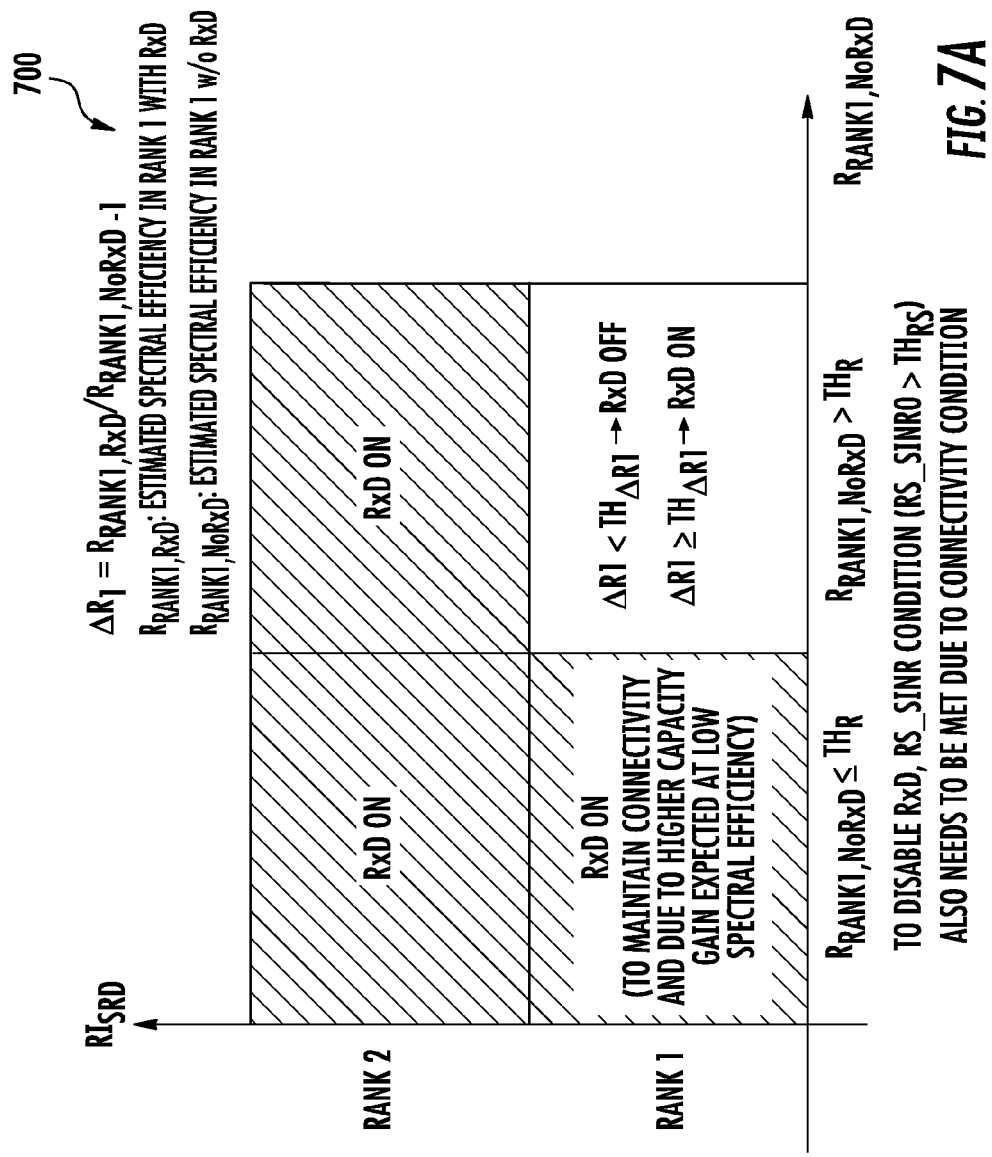
FIG. 7A is a graphical representation of one exemplary embodiment of a scheme for ARD using rank indication ($\Delta R_1$) as a capacity condition, without rank override capability, in accordance with the present disclosure.

Referring now to FIG. 7A, one exemplary embodiment of a method 700 for adaptive or "intelligent" receiver diversity operation within a wireless network, in accordance with Implementation Example #4 of TABLE 1 is depicted. In Example #4 (as in Examples #2, #3), receiver diversity is always enabled during transmissions of rank two (2) state, but can be disabled during transmissions of rank one (1). For transmissions of rank one (1), the key capacity condition is met when the spectral efficiency as represented by $R_{Rank1,NORXD}$ is greater than a minimum threshold ($TH_R$), and the ΔR1 is greater than a minimum threshold ($TH_{\Delta R1}$).

Figure 7B:
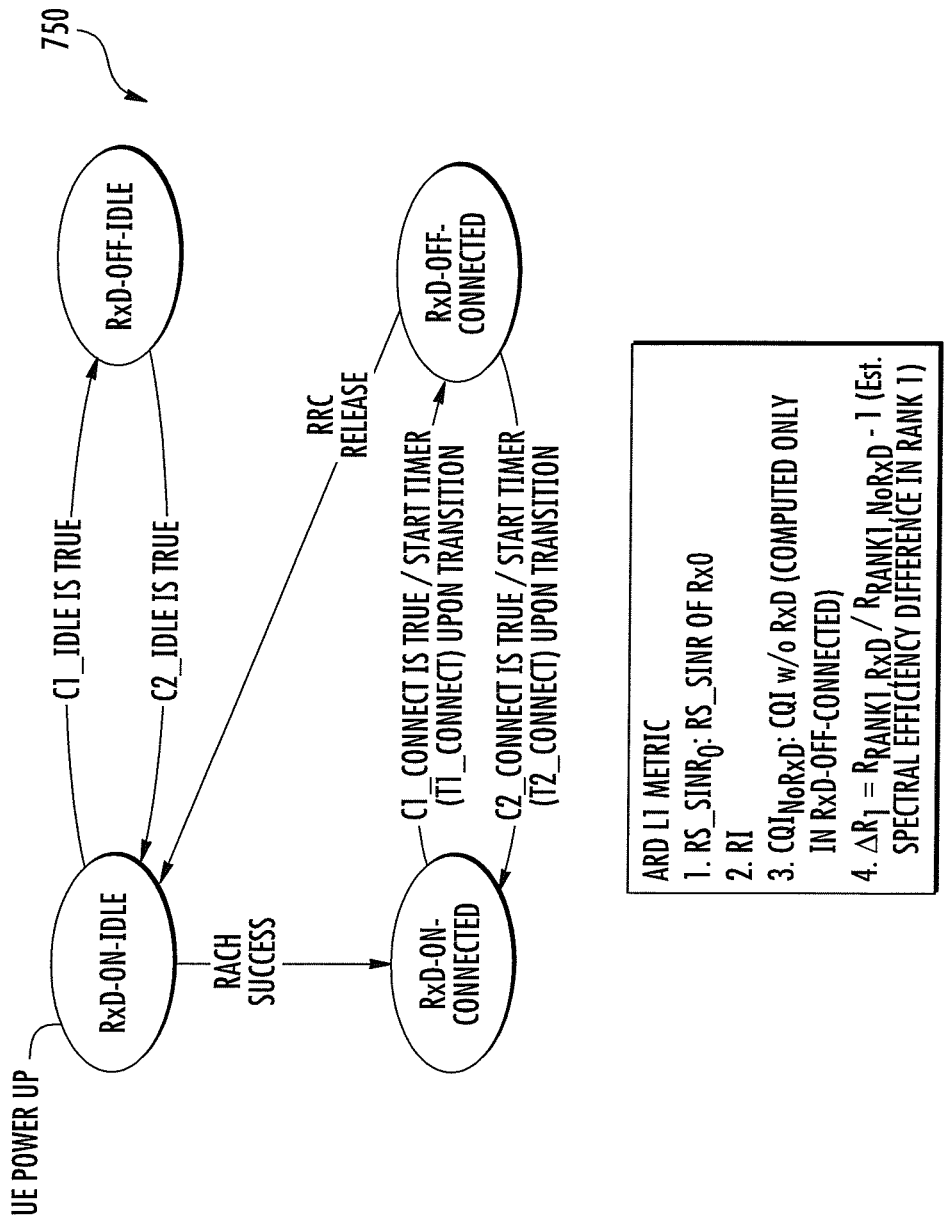
FIG. 7B is a graphical representation of one exemplary embodiment of a finite state machine (FSM) for the exemplary scheme of FIG. 7A, in accordance with the present disclosure.

FIG. 7B is a logical representation of an embodiment of a finite state machine (FSM) 750 representation of the scheme of FIG. 7A. As shown, the FSM has an IDLE RRC state with receiver diversity enabled (RxD-ON-IDLE), a CONNECTED RRC state with receiver diversity enabled (RxD-ON-CONNECTED), an IDLE RRC state with receiver diversity disabled (RxD-OFF-IDLE), and a CONNECTED RRC state with receiver diversity disabled (RxD-OFF-CONNECTED).

The transition conditions for RxD-OFF-IDLE are the same as the implementation of Example #2, and the transition to RxD-OFF-CONNECTED are very similar to those used within Implementation Example #2. However, rather than using ΔRS_SINR, Implementation Example #4 performs state transitions based on rank based measurements ($R_{Rank1,NORXD}$, and ΔR1). Specifically, the capacity conditions for Example #4 are where (e. g., $R_{Rank1, NORXD}$ is greater than a maximum threshold ($TH_8$) and the UE has been reporting a consistent RI of rank one (1) for a number of consecutive subframes (N_Rank1) and ΔRI is less than a minimum threshold ($TH_9$), where ΔR1 is the estimated spectral efficiency difference in Rank 1 (ΔR1 =$R_{Rank1,RXD}$/$R_{Rank1,NORXD}$−1). The other conditions may remain the same (or be substituted with similar conditions).

As part of the rank indicator (RI) computation, the UE typically calculates an estimated spectral efficiency (R) for different MIMO operation modes. R is expressed as bps/Hz (bits per second per bandwidth), and R can be computed from the SINR per subcarrier based on an assumed rank and MIMO equalizer type (see e.g., APPENDIX). As with CQI calculations, rank calculations are more complex computations than e.g., RS_SINR, but rank calculations can provide another reasonable metric to predict how switching to non-diversity operation would impact ongoing communications.

Implementation Example #5

For legacy LTE UEs, the rank report provided by the UE is provided to the eNB to maximize the capacity improvements of rank two (2) transmissions over rank one (1) transmissions. However, as discussed hereinafter (in both Implementation Example #5 and Implementation Example #6), certain implementations may enable adaptive receiver diversity (ARD) to override rank assignments; this override results in some minimal capacity degradation, but also saves significant power.

Figure 8A:
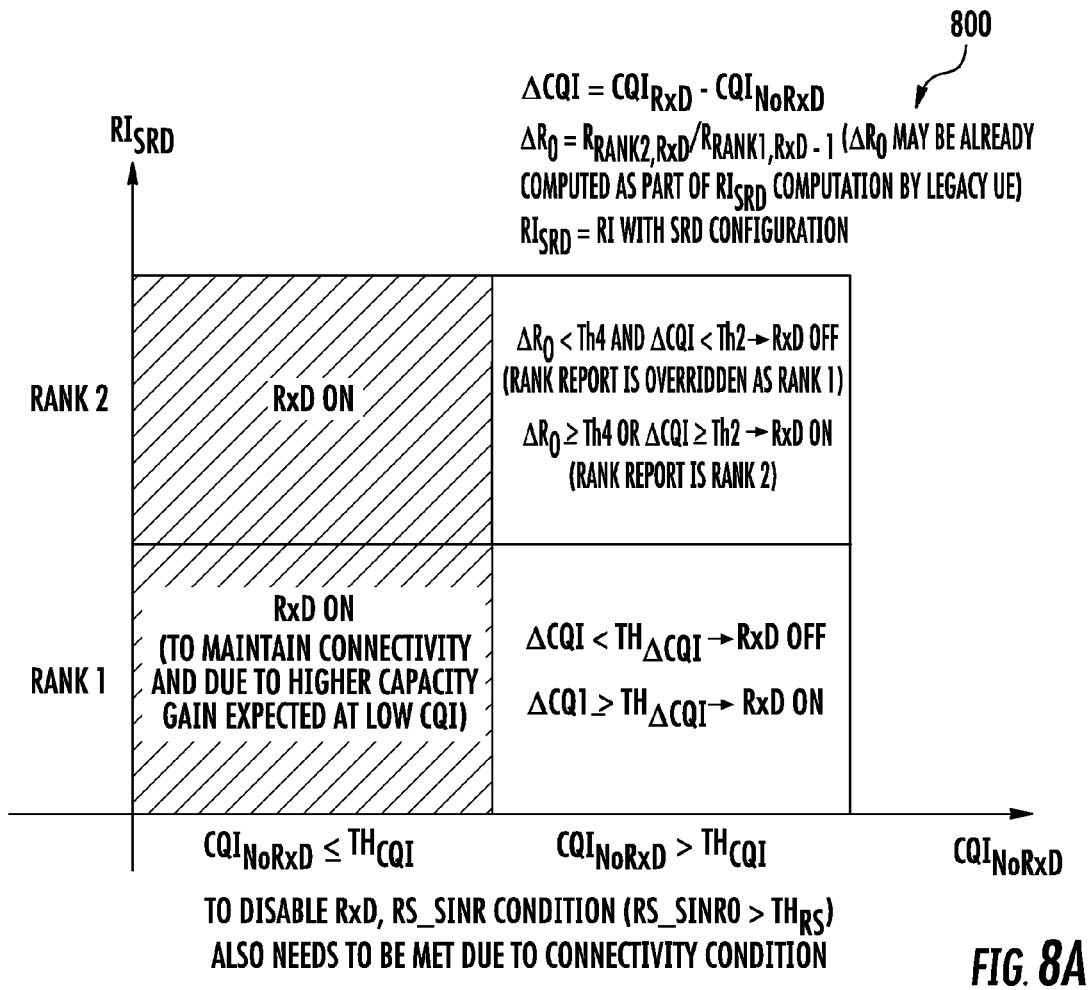
FIG. 8A is a graphical representation of one exemplary embodiment of a scheme for ARD using channel quality indication ($\Delta CQI$) as a capacity condition, with dynamic rank override capability, in accordance with the present disclosure.

Referring now to FIG. 8A, one exemplary embodiment of a method 800 for adaptive or "intelligent" receiver diversity operation within a wireless network, in accordance with Implementation Example #5 of TABLE 1 is depicted. Example #5 is very similar to Example #3, with the addition that the receiver can override a rank two (2) indication when: $CQI_{NORXD}$ is greater than a minimum threshold ($TH_{CQI}$), the ΔCQI is less than a minimum threshold ($TH_2$) and $\Delta R_0$ is less than a minimum threshold ($TH_4$), where $\Delta R_0$ is given by EQN. 3:

$$\Delta R_0 = (R_{Rank2,RXD}/R_{Rank1,RXD}) - 1 \qquad \text{EQN. 3}$$

$\Delta R_0$ represents a comparison of the spectral efficiencies of rank two (2) operation versus rank one (1) operation; thus, where $\Delta R_0$ is less than a minimum threshold (i.e., the difference between rank two (2) and rank one (1) is negligible), the receiver can dynamically override the rank two (2) indication. More directly, the receiver can override the rank two (2) indication when the benefits accrued from rank two (2) operation do not justify its use.

Figure 8B:
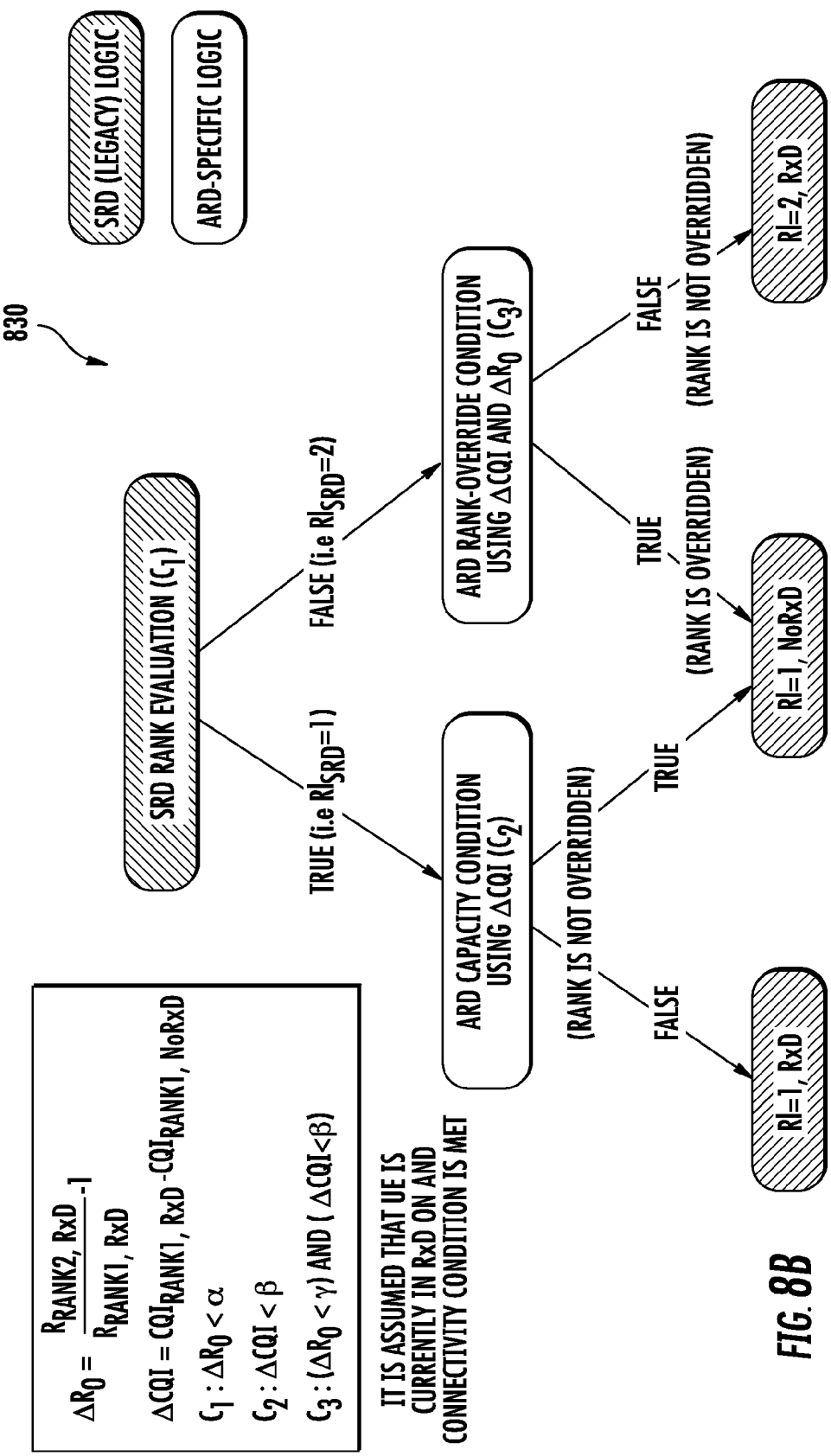
FIG. 8B is a logical representation of one exemplary embodiment of a decision tree of capacity conditions for the exemplary scheme of FIG. 8A, in accordance with the present disclosure.

FIG. 8B is a logical representation of an exemplary embodiment of a decision tree of capacity conditions 830. As shown, based on a static receiver diversity (SRD) rank evaluation condition (e.g., EQN. 3), the receiver can determine when to override the rank indication. Specifically, when the $RI_{SRD}$ is set to one (1), the capacity condition of $\Delta CQI$ is used to determine if diversity operation should be enabled or disabled. However, when the $RI_{SRD}$ is set to two (2), the capacity condition of $\Delta CQI$ and $\Delta R_0$ is used to determine if diversity operation should be enabled in accordance with $RI_{SRD}$, or disabled (thereby overriding the $RI_{SRD}$).

Figure 8C:
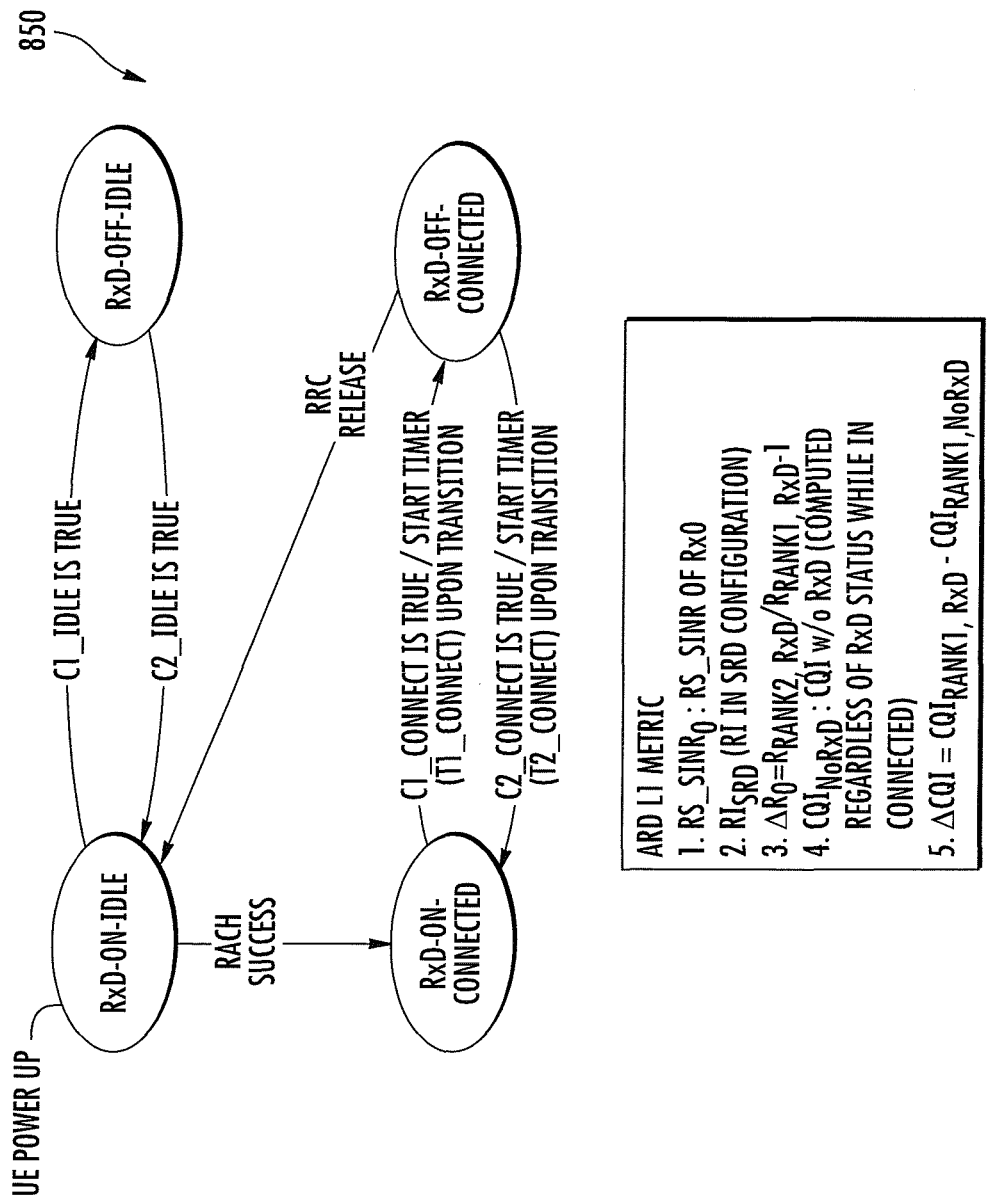
FIG. 8C is a graphical representation of one exemplary embodiment of a finite state machine (FSM) for the exemplary scheme of FIG. 8A, in accordance with the present disclosure.

FIG. 8C is a logical representation of an embodiment of a finite state machine (FSM) 850 incorporating both FIG. 8A and FIG. 8B. As shown, the FSM has an IDLE RRC state with receiver diversity enabled (RxD-ON-IDLE), a CONNECTED RRC state with receiver diversity enabled (RxD-ON-CONNECTED), an IDLE RRC state with receiver diversity disabled (RxD-OFF-IDLE), and a CONNECTED RRC state with receiver diversity disabled (RxD-OFF-CONNECTED).

The transition conditions for RxD-OFF-IDLE and RxD-OFF-CONNECTED are very similar to those used within Implementation Example #3. However, the logic for implementing the C1_CONNECT transition has been further supplanted with the logic represented by the decision tree of FIG. 8B. Specifically, the capacity conditions for Example #5 require that at least one of the following is true: (a) $RI_{SRD}$=rank one (1) and $\Delta CQI$ exceeds a maximum threshold ($TH_7$), or alternately (b) (a) $RI_{SRD}$=rank two (2) and $\Delta CQI$ is below a minimum threshold ($TH_7$) and $\Delta R0$ is less than a minimum threshold ($TH_{10}$). If either of these conditions are met, then the receiver overrides the RI rank report as rank one (1). The other conditions may remain the same (or be substituted with similar conditions).

Implementation Example #6

Figure 9A:
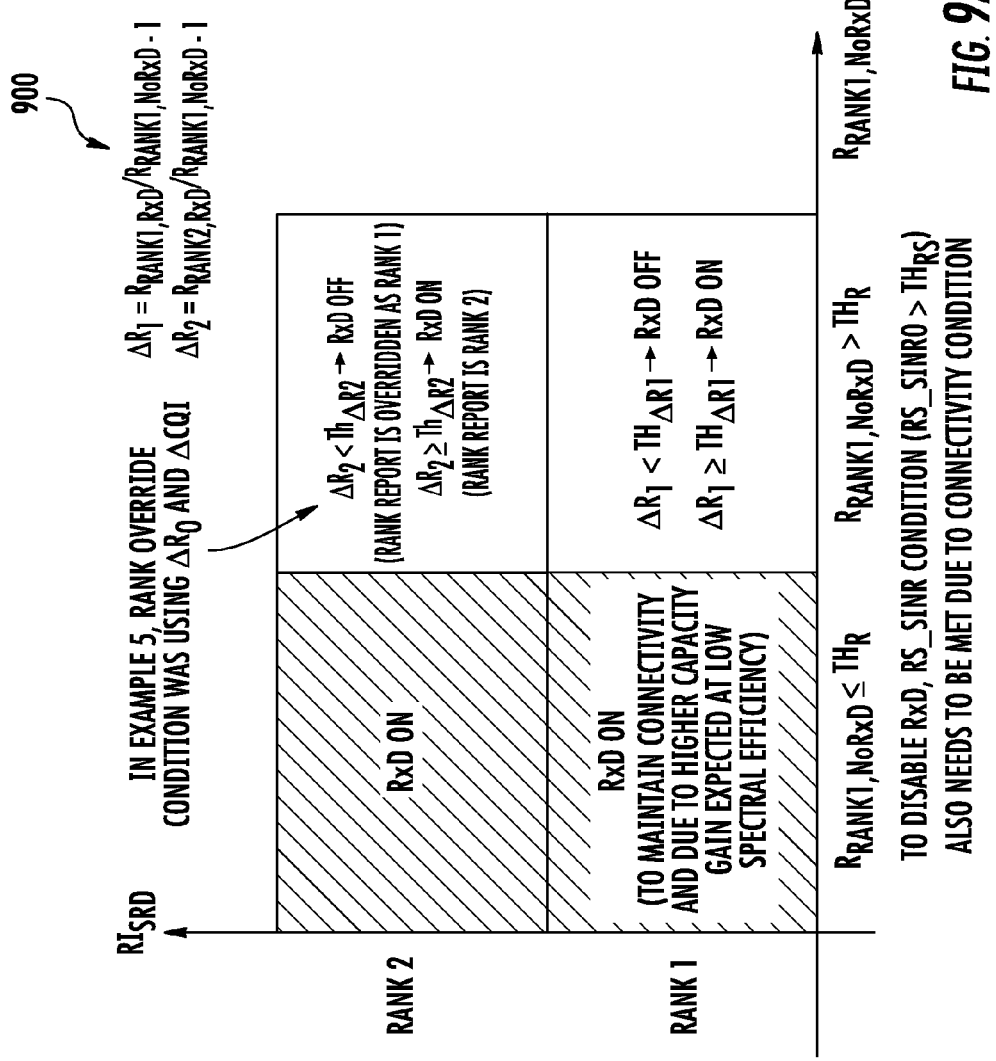
FIG. 9A is a graphical representation of one exemplary embodiment of a scheme for ARD using rank indications ($\Delta R1$, $\Delta R2$) as a capacity condition, with dynamic rank override capability, in accordance with the present disclosure.

Referring now to FIG. 9A, one exemplary embodiment of a method 900 for adaptive or "intelligent" receiver diversity operation within a wireless network, in accordance with Implementation Example #6 of TABLE 1 is depicted. Where Example #5 was based on CQI based measurements in conjunction with rank metrics, Example #6 enables diversity operation based on two distinct rank metrics $\Delta R_1$, and $\Delta R_2$:

$$\Delta R_1 = (R_{Rank1,RXD}/R_{Rank1,NORXD}) - 1 \quad \text{EQN. 4}$$

$$\Delta R_2 = (R_{Rank2,RXD}/R_{Rank1,NORXD}) - 1 \quad \text{EQN. 5}$$

Specifically, as expressed in EQN. 4 and EQN. 5, $\Delta R_1$ and $\Delta R_2$ represent the spectral difference between using rank one (1) with diversity ($R_{Rank1,RXD}$) as a function of rank one (1) without diversity ($R_{Rank1,NORXD}$), and rank two (2) with diversity ($R_{Rank1,RXD}$) as a function of $R_{Rank1,NORXD}$, respectively. Similar to previously ascribed embodiment of Implementation Example #5, the evaluation of the rank allows the receiver to determine if the benefits accrued from rank two (2) operations do not justify its use.

Figure 9B:
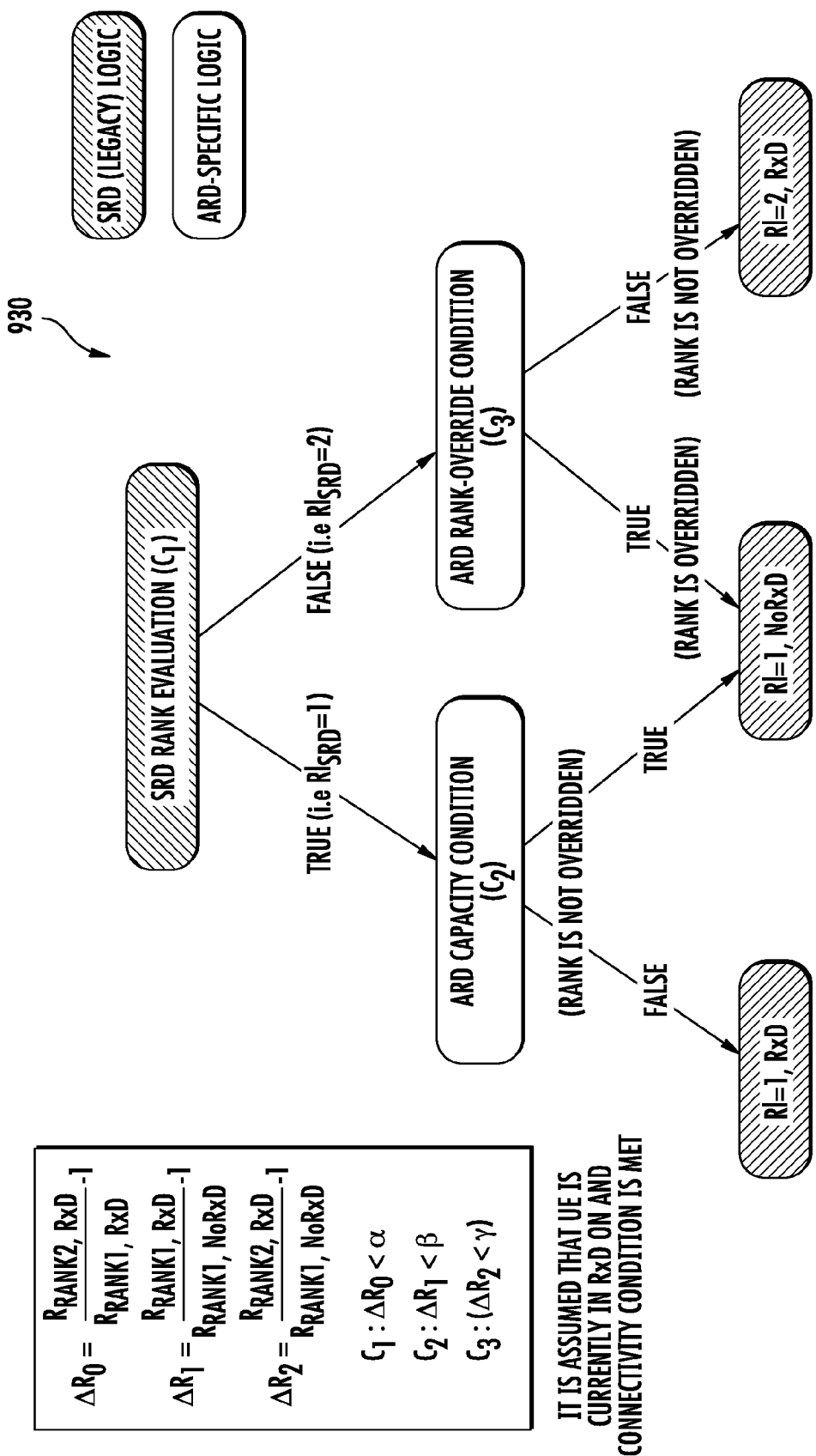
FIG. 9B is a logical representation of one exemplary embodiment of a decision tree of capacity conditions for the exemplary scheme of FIG. 9A, in accordance with the present disclosure.

FIG. 9B is a logical representation of a decision tree of capacity conditions 930. As shown, based on a static receiver diversity (SRD) rank evaluation condition (e.g., EQN. 3, EQN. 4, and EQN. 5), the receiver can determine when to override the rank indication. Specifically, when the $RI_{SRD}$ is set to one (1), the capacity condition of $\Delta R_1$ is used to determine if diversity operation should be enabled or disabled. However, when the $RI_{SRD}$ is set to two (2), the capacity condition of $\Delta R_2$ is used to determine if diversity operation should be enabled in accordance with $RI_{SRD}$, or disabled (thereby overriding the $RI_{SRD}$).

Figure 9C:
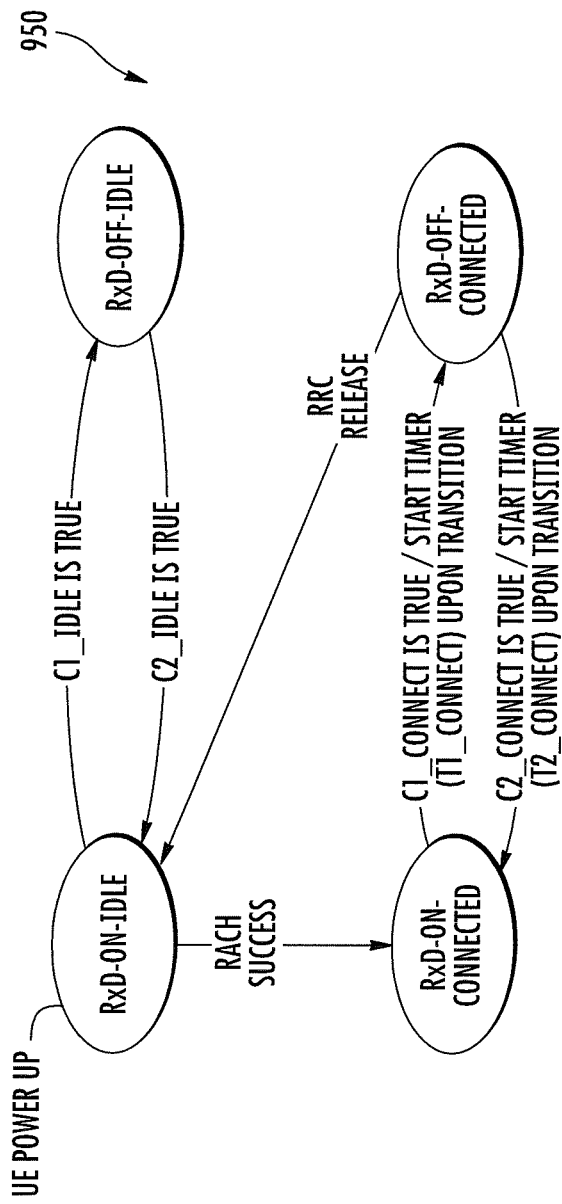
FIG. 9C is a graphical representation of one exemplary embodiment of a finite state machine (FSM) for the exemplary scheme of FIG. 9A, in accordance with the present disclosure.

FIG. 9C is a logical representation of an embodiment of a finite state machine (FSM) 950 incorporating both FIG. 9A and FIG. 9B. As shown, the FSM has an IDLE RRC state with receiver diversity enabled (RxD-ON-IDLE), a CONNECTED RRC state with receiver diversity enabled (RxD-ON-CONNECTED), an IDLE RRC state with receiver diversity disabled (RxD-OFF-IDLE), and a CONNECTED RRC state with receiver diversity disabled (RxD-OFF-CONNECTED).

The transition conditions for RxD-OFF-IDLE and RxD-OFF-CONNECTED are very similar to those used within Implementation Example #4. However, the logic for implementing the C1_CONNECT transition has been further supplanted with the logic represented by the decision tree of FIG. 9B. Specifically, the capacity conditions for Example #6 require that at least one of the following is true: (a) $RI_{SRD}$=rank one (1) and $\Delta R1$ is below a minimum threshold ($TH_9$) where $\Delta R1$ is the estimated spectral efficiency difference in Rank 1 ($\Delta R1 = R_{Rank1,RXD}/R_{Rank1,NORXD} - 1$), or alternately (b) (a) $RI_{SRD}$=rank two (2) and $\Delta R2$ is below a minimum threshold ($TH_{11}$) where $\Delta R2$ is the estimated spectral efficiency difference in Rank 2 ($\Delta R2 = R_{Rank2,RXD}/R_{Rank1,NORXD} - 1$). If either of these conditions are met, then the receiver overrides the RI rank report as rank one (1). The other conditions may remain the same (or be substituted with similar conditions).

While the foregoing examples have provided multiple illustrative embodiments consistent with the principles described herein, it should be appreciated that still other embodiments may incorporate, augment, and/or substitute various conditions.

For example, to disable receiver diversity, the transceiver may incorporate any of the following metrics, without limitations: (i) $\Delta RS\_SINR$, (ii) $\Delta CQI$, (iii) $\Delta R$, (iv) equalizer energy ratios ($|w_1|^2/|w_0|^2$), where $w_1$ and $w_0$ are the equalizer tap values for the first and second receiver chains respectively), etc.

In still other embodiments, capacity conditions may be based on certain types of events. Examples of such events include, without limitation, low scheduling ratios in downlink while the $CQI_{NORXD}$ is high, high grant ratios in the uplink during CONNECTED states, where the UE has reported rank one (1) for K1 subframes and rank two (2) transmissions have not been schedule for K2 subframes, etc. Moreover, certain implementations may also require a minimum period for which diversity is enabled to ensure that the UE has enough time to accurately monitor link quality and evaluate other conditions reliably.

Similarly, the re-enable diversity operation, the transceiver may be consider e.g., timer values, PDSCH decoding failures during the CONNECTED state, overall block error rates (BLER) during CONNECTED states, control channel signaling which requires higher order ranks, and/or where the uplink grant is relatively small.

Wireless Apparatus—

Figure 10:
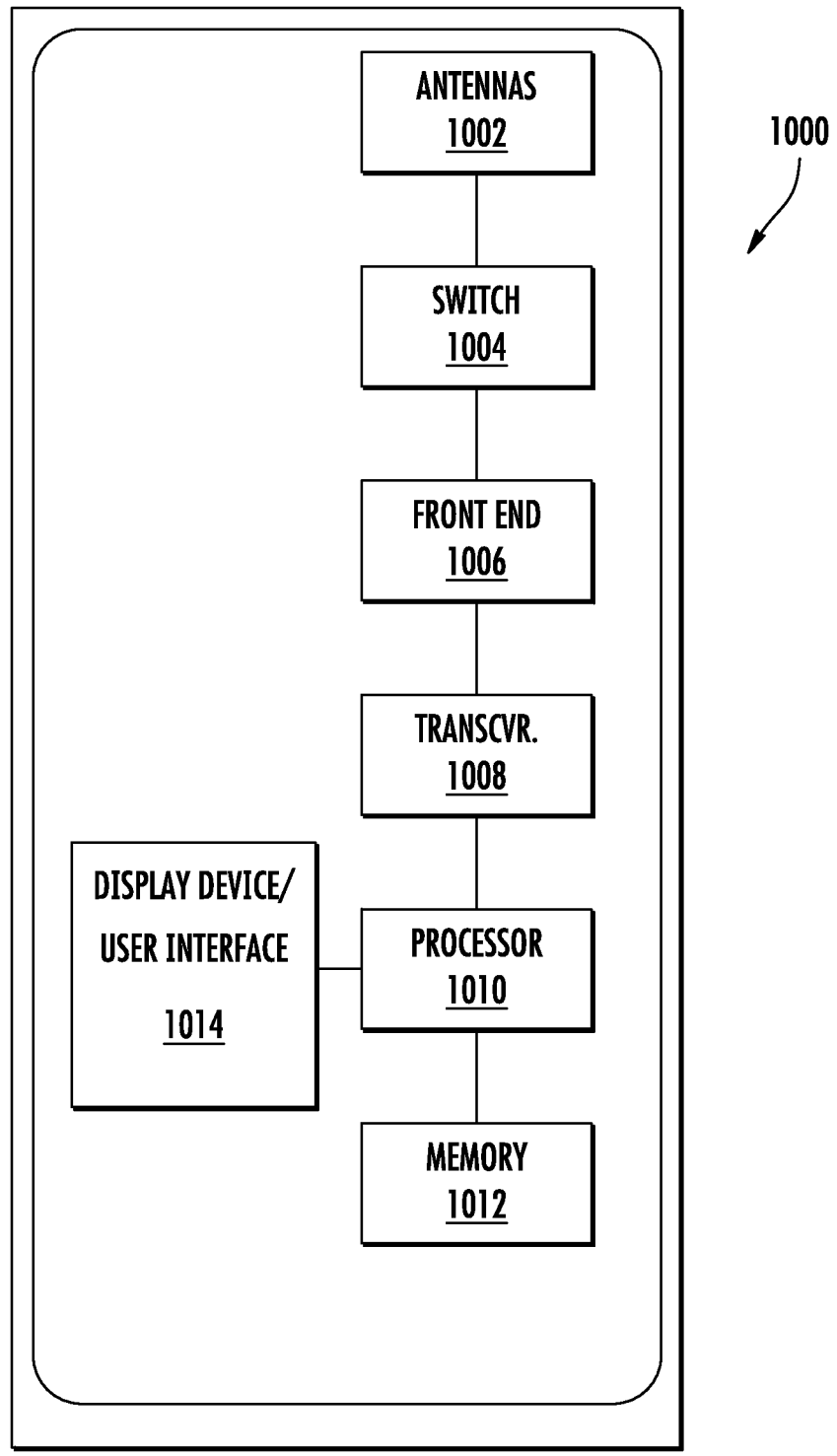
FIG. 10 is a logical block diagram of one embodiment of a radio transceiver device configured according to the disclosure.

Referring now to FIG. 10, an exemplary embodiment of a transceiver device 1000 configured for adaptive diversity reception within wireless networks is illustrated.

As used herein, the term "transceiver device" includes, but is not limited to cellular telephones, smartphones (such as for example an iPhone™), wireless-enabled tablet devices (such as for example an iPad™), or any combinations of the foregoing. Moreover other embodiments may include e.g., base stations, peer-to-peer wireless networking devices, wireless servers, wireless access points (e.g., APs), etc. While a primary benefit of the adaptive management methods described herein is power conservation (which is particularly useful for mobile devices such as smartphones), other benefits attributable to the present disclosure may be realized by other types of devices such as laptop computers, base stations, or access points.

While one specific device configuration and layout is shown and discussed herein, it is recognized that many other configurations may be readily implemented by one of ordinary skill given the present disclosure, the apparatus 1000 of FIG. 10 being merely illustrative of the broader principles described herein.

The apparatus 1000 of FIG. 10 includes two or more radio antennas 1002, a RF switch 1004 (e.g., the 2×2 switch 1004 of FIG. 2), an RF front end 1006, a transceiver 1008, a processor 1010, a non-transitory computer readable memory 1012, and user interface/display device 1014 (e.g., a capacitive touchscreen display device with so-called "multi-touch" or similar capability). Note that relevant ones of these components may be integrated with those of FIG. 2 herein (e.g., the receiver apparatus 200 of FIG. 2 may substitute for the relevant components listed above), or the transceiver apparatus 1000 may in fact have entirely separate receiver chains and air interfaces.

The processing subsystem 1010 (which may include or be separate from the BB processor 212 of FIG. 2) includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 1012, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The processing subsystem may also include additional co-processors, such as a dedicated graphics accelerator, network processor (NP), or audio/video processor. As shown processing subsystem 1010 includes discrete components; however, it is understood that in some embodiments they may be consolidated or fashioned in a SoC (system-on-chip) configuration.

The processing subsystem 1010 is adapted to receive and/or transmit data streams from the RF assembly (e.g., radio antennas 1002, RF switch 1004, RF front end 1006, and radio transceiver 1008). The RF assembly is configured for operation with a wireless standard, such as e.g., the Long Term Evolution (LTE) standard discussed supra, or yet other wireless standards which may employ diversity capability.

It will be appreciated that while certain embodiments are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles described herein. The scope of the present disclosure should be determined with reference to the claims.

APPENDIX

CQI Definition in LTE

- The UE shall derive the highest CQI index between 1 and 15 which satisfies the following condition, or CQI index 0 if CQI index 1 does not satisfy the condition:

– A single PDSCH transport block with a combination of modulation scheme and transport block size corresponding to the CQI index, and occupying a group of downlink physical resource blocks termed the CQI reference resource, could be received with a transport block error probability not exceeding 0.1

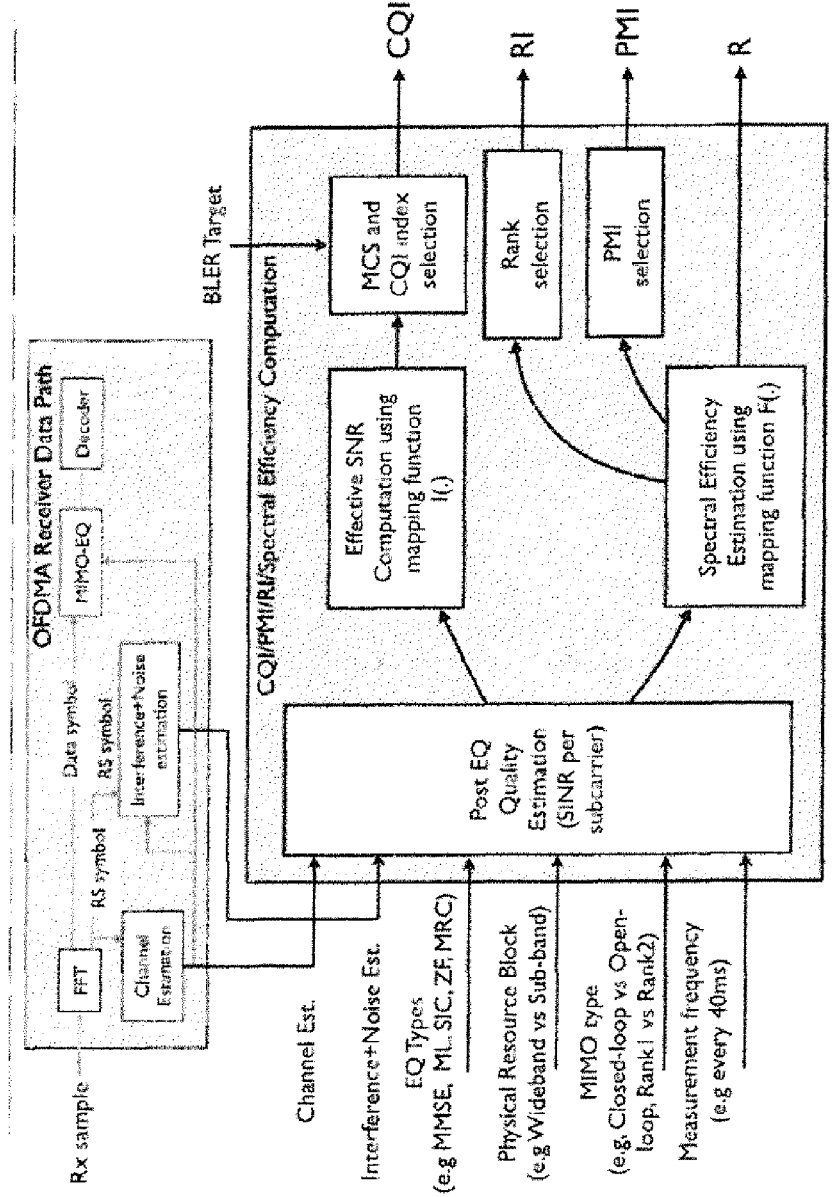

Post EQ Quality Estimation

- Calculation of the SINR at the output of the receiver for each subcarrier

- For Rank 2 transmission, SINR is computed for each codeword/spatial stream and needs to account for MIMO-EQ type (e.g MMSE receiver vs SIC receiver)

- For Rank 1 transmission w/ transmit diversity, SINR computation needs to account for transmit diversity combining

- For Closed loop transmission (for Rank 1 or Rank 2), SINR computation needs to account for precoding matrix

- Example computation of Rank 1 closed-loop SINR computation is shown in later slides for $CQI_{RxD}$ and $CQI_{NoRxD}$ computation

Effective SNR Computation

- In multi-path radio channel environment, SINR per subcarrier will greatly vary across subcarriers

- Effective SNR represents a single SNR value of frequency-flat channel (i.e. AWGN channel) that yields the same performance of frequency-selective channel with different SINR values across subcarriers

- The mapping from per-subcarrier SINRs (SINR's) to an effective SNR can be done by a reference function I(.) as defined below

- Examples of I(.) are
    - MMIB (Mean Mutual Information per Bit)
    - Cap-based AWGN capacity ( I(x) = log$_2$(1+x/T) )
    - EESM (Exponential Effective SNR Mapping)

$$SNR_{\text{eff}} = I^{-1}\left(\frac{1}{N}\sum_{i=0}^{N-1} I(SINR_i)\right)$$

where
- i: subcarrier index
- SINR$_i$: SINR of sub-carrier i
- N: Number of subcarriers for CQI computation

CQI Calculation

- From the effective SNR, CQI can be selected using one of the following methods

- Mapping based on a lookup table of effective SINR of each modulation coding scheme (MCS) that guarantees a certain BLER,

- A linear interpolation and quantization such as $$CQI = \left\lfloor \frac{10\log_{10}(SNR_{eff})}{a} + b \right\rfloor$$

where $a$ represents a scale in $SNR_{eff}$ (dB) to CQI-index while $b$ represents a bias in the mapping

SINR$_{RxD}$ vs SINR$_{NoRxD}$ in Rank 1

- Assume Rank 1 Closed loop 2x2 MIMO in LTE (eNB has 2 Tx antennas, UE has 2 Rx antennas)
- Denote the channel matrix for the $i$-th subcarrier as
  - $h_{rt}$ represents the channel gain from $t$-th Tx antenna to $r$-th Rx antenna
  - Subcarrier index $i$ is omitted for simplicity in channel matrix $$\mathbf{H} = \begin{bmatrix} \mathbf{h}_1 & \mathbf{h}_2 \end{bmatrix} = \begin{bmatrix} h_{11} & h_{12} \\ h_{21} & h_{22} \end{bmatrix}$$

- The precoding vector for Rank 1 transmission for a 2 Tx eNB is given by $$\mathbf{w} = \begin{bmatrix} w_1 \\ w_2 \end{bmatrix}$$

- Denote $N_0(i)$ as interference and noise power for the $i$-th subcarrier per Rx chain
  - Note that channel matrix and received samples can be scaled properly so that $N_0(i)$ is the same for each Rx chain

SINR$_{RxD}$ vs SINR$_{NoRxD}$ in Rank 1 (continued)

- Equivalent channel vector at the receiver due to pre-coding can be computed as $$\mathbf{g}(i) = \begin{bmatrix} g_1(i) \\ g_2(i) \end{bmatrix} = \mathbf{Hw} = w_1\mathbf{h}_1 + w_2\mathbf{h}_2 = \begin{bmatrix} w_1 h_{11} + w_2 h_{12} \\ w_1 h_{21} + w_2 h_{22} \end{bmatrix}$$

- The post receiver SINR for the *i*-th subcarrier (i) with RxD can be computed as:

$$\text{SINR}_{i,RxD} = \frac{\|\mathbf{g}(i)\|^2}{N_0(i)} = \frac{|g_1(i)|^2 + |g_2(i)|^2}{N_0(i)}$$

- For receiver without RxD, g(i) would be only g1(i); i.e., $$\text{SINR}_{i,NoRxD} = \frac{|g_1(i)|^2}{N_0(i)}$$

- Therefore, SINR per subcarrier with and without RxD are related as $$\text{SINR}_{i,RxD} = \text{SINR}_{i,NoRxD} + \frac{|g_2(i)|^2}{N_0(i)}$$

Spectral Efficiency (=R) Estimation

- For a given Rank and pre-coding matrix, SINR per subcarrier can be computed. Let [SINR$_i$] denote the Nx1 vector of per-subcarrier SINR values

- Spectral efficiency can be computed by using the mapping function $$R_{Rank2} = \max_{W_i \in \{W_1, \ldots, W_L\}} F([SINR_i^{CW1}(W_i)]) + F([SINR_i^{CW2}(W_i)])$$

$$R_{Rank1} = \max_{W_i \in \{W_1, \ldots, W_L\}} F([SINR_i(W_i)])$$

where

- F(.) is a mapping function that computes achievable spectral efficiency from per-subcarrier SINR values
  - CW$_k$ denotes the k-th codeword for Rank 2 transmission (k=1,2)
  - $W_i$ denotes the i-th precoding matrix

- One possible implementation of F(.) is $$F([SINR_i]) = \frac{1}{N} \sum_{i=0}^{N-1} \log_2(1 + SINR_i)$$

- Rank 2 may be reported if $\Delta R_0 = (R_{Rank2}/R_{Rank1}) - 1 > \alpha$

What is claimed is:

1. A mobile apparatus configured to implement adaptive receive diversity, the apparatus including:
    a processor;
    one or more wireless receivers configured to operate in at least a first and second diversity modes, wherein the first diversity mode uses a first diversity-enabled scheme supporting a first data capacity and the second diversity mode uses a second diversity-enabled scheme supporting a second data capacity; and
    computerized logic in data communication with the processor and one or more wireless receivers, and configured to cause the mobile apparatus to:
        evaluate a capacity condition and a connectivity condition;
        when the capacity condition and the connectivity condition are met, operate in the first diversity mode; and
        when either the capacity condition or the connectivity condition are not met, operate in the second diversity mode.

2. The mobile apparatus of claim 1, where the connectivity condition comprises a lack of cyclic redundancy check (CRC) failures over one or more consecutive paging cycles.

3. The mobile apparatus of claim 2, where the capacity condition comprises a reference signal to interference plus noise ratio (RS SINR) exceeding a first threshold.

4. The mobile apparatus of claim 2, where the capacity condition comprises a difference in a first reference signal to interference plus noise ratio (RS SINR) associated with the first diversity mode and a second RS SINR associated with the second diversity mode.

5. The mobile apparatus of claim 2, where the capacity condition comprises a difference in a first channel quality indication (CQI) associated with the first diversity mode and a second CQI associated with the second diversity mode.

6. The mobile apparatus of claim 2, where the capacity condition comprises a difference in a first spectral efficiency associated with the first diversity mode and a second spectral efficiency associated with the second diversity mode.

7. A method for intelligently performing adaptive receive diversity, the method including:
    determining (i) a connectivity criterion and (ii) a capacity criterion;
    communicating via a wireless receiver, the wireless receiver configurable in at least a first diversity-enabled scheme and a second diversity-enabled scheme;
    where the first diversity-enabled scheme can support more data capacity than the second diversity-enabled scheme;
    comparing a current signal quality measurement to a capacity condition;
    comparing a current connection quality to a connectivity condition;
    when operating in the first diversity-enabled scheme:
        when the current signal quality measurement satisfies the capacity condition and the current connection quality satisfies the connectivity condition, transitioning to the second diversity-enabled scheme; and
    when operating in the second diversity-enabled scheme:
        when either the current signal quality measurement does not satisfy the capacity condition or the current connection quality does not satisfy the connectivity condition, transitioning to the first diversity-enabled scheme.

8. The method of claim 7, where the first diversity-enabled scheme comprises a multiple input multiple output (MIMO) diversity scheme.

9. The method of claim 8, where the second diversity-enabled scheme comprises a lower order MIMO diversity scheme.

10. The method of claim 7, where the signal quality measurement comprises a signal to interference plus noise ratio (SINR).

11. The method of claim 7, where the signal quality measurement comprises a channel quality indication (CQI).

12. The method of claim 7, where the signal quality measurement comprises a difference between a first signal quality measurement associated with the first diversity-enabled scheme and a second signal quality measurement associated with the second diversity-enabled scheme.

13. The method of claim 7, where the current connection quality is based on a reference signal to interference plus noise ratio (RS_SINR) that is greater than a threshold or one or more cyclic redundancy checks of one or more control channels.

14. A method for dynamically overriding a rank instruction, the method including:
    communicating via a wireless receiver, the wireless receiver configured to select at least a first diversity-enabled scheme and a second diversity-enabled scheme based on a rank indication signal received from a wireless transmitter and an override signal;
    where the first diversity-enabled scheme can support more data capacity than the second diversity-enabled scheme;
    comparing a current signal quality measurement to a capacity condition;
    comparing a current connection quality to a connectivity condition;
    when the current signal quality measurement satisfies the capacity condition and the current connection quality satisfies the connectivity condition, enabling the override signal to select the second diversity-enabled scheme; and
    otherwise selecting a diversity-enabled scheme identified by the rank indication signal.

15. The method of claim 14, where the first diversity-enabled scheme comprises a multiple input multiple output (MIMO) diversity scheme.

16. The method of claim 14, where enabling the override signal results in reduced power consumption.

* * * * *